(12) United States Patent
Ganesan

(10) Patent No.: US 8,323,584 B2
(45) Date of Patent: *Dec. 4, 2012

(54) METHOD OF CONTROLLING A MICROFLUIDIC DEVICE HAVING A REDUCED NUMBER OF INPUT AND OUTPUT CONNECTIONS

(75) Inventor: Karthik Ganesan, Ann Arbor, MI (US)

(73) Assignee: HandyLab, Inc., Franklin Lakes, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/280,270

(22) Filed: Oct. 24, 2011

(65) Prior Publication Data

US 2012/0085416 A1    Apr. 12, 2012

Related U.S. Application Data

(63) Continuation of application No. 12/717,075, filed on Mar. 3, 2010, now Pat. No. 8,043,581, which is a continuation of application No. 10/489,404, filed as application No. PCT/US02/29012 on Sep. 12, 2002, now Pat. No. 7,674,431, which is a continuation of application No. 09/949,763, filed on Sep. 12, 2001, now Pat. No. 6,852,287.

(51) Int. Cl.
*G01N 33/00*    (2006.01)

(52) U.S. Cl. ............... 422/500; 422/50; 422/68.1

(58) Field of Classification Search ............ 422/50, 422/68.1, 500
See application file for complete search history.

(56) References Cited

U.S. PATENT DOCUMENTS

| | | |
|---|---|---|
| 1,434,314 A | 10/1922 | Raich |
| 1,616,419 A | 2/1927 | Wilson |
| 1,733,401 A | 8/1930 | Lovekin |
| 3,528,449 A | 9/1970 | Witte et al. |
| 3,985,649 A | 10/1976 | Eddelman |
| 4,018,089 A | 4/1977 | Dzula et al. |

(Continued)

FOREIGN PATENT DOCUMENTS

CA    2294819    1/1999

(Continued)

OTHER PUBLICATIONS

Bollet, C. et al., "A simple method for the isolation of chromosomal DNA from Gram positive or acid-fast bacteria", Nucleic Acids Research, vol. 19, No. 8 (1991), p. 1955.

(Continued)

*Primary Examiner* — Sam P Siefke
(74) *Attorney, Agent, or Firm* — Knobbe Martens Olson & Bear, LLP

(57) ABSTRACT

A system and method for reducing the number of input/output connections required to connect a microfluidic substrate to an external controller for controlling the substrate. A microfluidic processing device is fabricated on a substrate having a plurality of N independently controllable components, (e.g., a resistive heating elements) each having at least two terminals. The substrate includes a plurality of input/output contacts for connecting the substrate to an external controller, and a plurality of leads for connecting the contacts to the terminals of the components. The leads are arranged to allow the external controller to supply control signals to the terminals of the components via the contacts using substantially fewer contacts than the total number of component terminals. The components are independently controlled by arranging the leads so that each component's terminals are connected to a unique combination of contacts.

20 Claims, 10 Drawing Sheets

U.S. PATENT DOCUMENTS

| | | |
|---|---|---|
| 4,018,652 A | 4/1977 | Lanham et al. |
| 4,038,192 A | 7/1977 | Serur |
| 4,055,395 A | 10/1977 | Honkawa et al. |
| D249,706 S | 9/1978 | Adamski |
| 4,139,005 A | 2/1979 | Dickey |
| D252,157 S | 6/1979 | Kronish et al. |
| D252,341 S | 7/1979 | Thomas |
| D254,687 S | 4/1980 | Fadler et al. |
| 4,212,744 A | 7/1980 | Oota |
| D261,033 S | 9/1981 | Armbruster |
| D261,173 S | 10/1981 | Armbruster |
| 4,301,412 A | 11/1981 | Hill et al. |
| 4,439,526 A | 3/1984 | Columbus |
| 4,457,329 A | 7/1984 | Werley et al. |
| 4,466,740 A | 8/1984 | Kano et al. |
| 4,504,582 A | 3/1985 | Swann |
| 4,522,786 A | 6/1985 | Ebersole |
| D279,817 S | 7/1985 | Chen et al. |
| 4,599,315 A | 7/1986 | Terasaki et al. |
| 4,612,873 A | 9/1986 | Eberle |
| 4,612,959 A | 9/1986 | Costello |
| D288,478 S | 2/1987 | Carlson et al. |
| 4,654,127 A | 3/1987 | Baker et al. |
| 4,673,657 A | 6/1987 | Christian |
| 4,683,195 A | 7/1987 | Mullis et al. |
| 4,683,202 A | 7/1987 | Mullis |
| D292,735 S | 11/1987 | Lovborg |
| 4,720,374 A | 1/1988 | Ramachandran |
| 4,798,693 A | 1/1989 | Mase et al. |
| 4,800,022 A | 1/1989 | Leonard |
| 4,841,786 A | 6/1989 | Schulz |
| D302,294 S | 7/1989 | Hillman |
| 4,871,779 A | 10/1989 | Killat et al. |
| 4,895,650 A | 1/1990 | Wang |
| 4,919,829 A | 4/1990 | Gates et al. |
| 4,921,809 A | 5/1990 | Shiff et al. |
| 4,935,342 A | 6/1990 | Seligson et al. |
| 4,946,562 A | 8/1990 | Guruswamy |
| 4,949,742 A | 8/1990 | Rando et al. |
| D310,413 S | 9/1990 | Bigler et al. |
| 4,963,498 A | 10/1990 | Hillman |
| 4,967,950 A | 11/1990 | Legg et al. |
| 4,978,502 A | 12/1990 | Dole et al. |
| 4,978,622 A | 12/1990 | Mishell et al. |
| 4,989,626 A | 2/1991 | Takagi et al. |
| 5,001,417 A | 3/1991 | Pumphrey et al. |
| 5,004,583 A | 4/1991 | Guruswamy et al. |
| 5,048,554 A | 9/1991 | Kremer |
| 5,053,199 A | 10/1991 | Keiser et al. |
| 5,060,823 A | 10/1991 | Perlman |
| 5,061,336 A | 10/1991 | Soane |
| 5,064,618 A | 11/1991 | Baker et al. |
| 5,071,531 A | 12/1991 | Soane |
| 5,091,328 A | 2/1992 | Miller |
| D324,426 S | 3/1992 | Fan et al. |
| 5,096,669 A | 3/1992 | Lauks et al. |
| 5,126,002 A | 6/1992 | Iwata et al. |
| 5,126,022 A | 6/1992 | Soane et al. |
| D328,135 S | 7/1992 | Fan et al. |
| D328,794 S | 8/1992 | Frenkel et al. |
| 5,135,627 A | 8/1992 | Soane |
| 5,135,872 A | 8/1992 | Pouletty et al. |
| 5,147,606 A | 9/1992 | Charlton et al. |
| 5,169,512 A | 12/1992 | Wiedenmann et al. |
| D333,522 S | 2/1993 | Gianino |
| 5,186,339 A | 2/1993 | Heissler |
| 5,192,507 A | 3/1993 | Taylor et al. |
| 5,208,163 A | 5/1993 | Charlton et al. |
| 5,223,226 A | 6/1993 | Whittmer et al. |
| D338,275 S | 8/1993 | Fischer et al. |
| 5,250,263 A | 10/1993 | Manz |
| 5,252,743 A | 10/1993 | Barrett et al. |
| 5,256,376 A | 10/1993 | Callan et al. |
| 5,275,787 A | 1/1994 | Yuguchi et al. |
| 5,282,950 A | 2/1994 | Dietze et al. |
| 5,296,375 A | 3/1994 | Kricka et al. |
| 5,304,477 A | 4/1994 | Nagoh et al. |
| 5,304,487 A | 4/1994 | Wilding et al. |
| D347,478 S | 5/1994 | Pinkney |
| 5,311,896 A | 5/1994 | Kaartinen et al. |
| 5,311,996 A | 5/1994 | Duffy et al. |
| 5,316,727 A | 5/1994 | Suzuki et al. |
| 5,327,038 A | 7/1994 | Culp |
| 5,339,486 A | 8/1994 | Persic, Jr. |
| D351,913 S | 10/1994 | Hieb et al. |
| 5,364,591 A | 11/1994 | Green et al. |
| 5,372,946 A | 12/1994 | Cusak et al. |
| 5,374,395 A | 12/1994 | Robinson |
| 5,389,339 A | 2/1995 | Petschek et al. |
| 5,397,709 A | 3/1995 | Berndt |
| 5,401,465 A | 3/1995 | Smethers et al. |
| 5,411,708 A | 5/1995 | Moscetta et al. |
| 5,414,245 A | 5/1995 | Hackleman |
| 5,416,000 A | 5/1995 | Allen et al. |
| 5,422,271 A | 6/1995 | Chen et al. |
| 5,422,284 A | 6/1995 | Lau |
| 5,427,946 A | 6/1995 | Kricka et al. |
| 5,474,796 A | 12/1995 | Brennan |
| D366,116 S | 1/1996 | Biskupski |
| 5,486,335 A | 1/1996 | Wilding et al. |
| 5,494,639 A | 2/1996 | Grzegorzewski |
| 5,498,392 A | 3/1996 | Wilding et al. |
| 5,503,803 A | 4/1996 | Brown |
| 5,516,410 A | 5/1996 | Schneider et al. |
| 5,519,635 A | 5/1996 | Miyake et al. |
| 5,529,677 A | 6/1996 | Schneider et al. |
| 5,559,432 A | 9/1996 | Logue |
| 5,565,171 A | 10/1996 | Dovichi et al. |
| 5,569,364 A | 10/1996 | Hooper et al. |
| 5,578,818 A | 11/1996 | Kain et al. |
| 5,580,523 A | 12/1996 | Bard |
| 5,582,884 A | 12/1996 | Ball et al. |
| 5,585,069 A | 12/1996 | Zanucchi et al. |
| 5,585,089 A | 12/1996 | Queen et al. |
| 5,585,242 A | 12/1996 | Bouma et al. |
| 5,587,128 A | 12/1996 | Wilding et al. |
| 5,589,136 A | 12/1996 | Northrup et al. |
| 5,593,838 A | 1/1997 | Zanzucchi et al. |
| 5,595,708 A | 1/1997 | Berndt |
| 5,599,432 A | 2/1997 | Manz et al. |
| 5,599,503 A | 2/1997 | Manz et al. |
| 5,599,667 A | 2/1997 | Arnold, Jr. et al. |
| 5,601,727 A | 2/1997 | Bormann et al. |
| 5,603,351 A | 2/1997 | Cherukuri et al. |
| 5,605,662 A | 2/1997 | Heller et al. |
| D378,782 S | 4/1997 | LaBarbera et al. |
| 5,628,890 A | 5/1997 | Carter et al. |
| 5,630,920 A | 5/1997 | Friese et al. |
| 5,631,337 A | 5/1997 | Sassi et al. |
| 5,632,876 A | 5/1997 | Zanzucchi et al. |
| 5,632,957 A | 5/1997 | Heller et al. |
| 5,635,358 A | 6/1997 | Wilding et al. |
| 5,637,469 A | 6/1997 | Wilding et al. |
| 5,639,423 A | 6/1997 | Northrup et al. |
| 5,643,738 A | 7/1997 | Zanzucchi et al. |
| 5,646,039 A | 7/1997 | Northrup et al. |
| 5,647,994 A | 7/1997 | Tuunanen et al. |
| 5,651,839 A | 7/1997 | Rauf |
| 5,652,149 A | 7/1997 | Mileaf et al. |
| D382,346 S | 8/1997 | Buhler et al. |
| D382,647 S | 8/1997 | Staples et al. |
| 5,667,976 A | 9/1997 | Van Ness et al. |
| 5,671,303 A | 9/1997 | Shieh et al. |
| 5,674,394 A | 10/1997 | Whitmore |
| 5,674,742 A | 10/1997 | Northrup et al. |
| 5,681,484 A | 10/1997 | Zanzucchi et al. |
| 5,681,529 A | 10/1997 | Taguchi et al. |
| 5,683,657 A | 11/1997 | Mian |
| 5,699,157 A | 12/1997 | Parce |
| 5,700,637 A | 12/1997 | Southern |
| 5,705,813 A | 1/1998 | Apffel et al. |
| 5,726,026 A | 3/1998 | Wilding et al. |
| 5,726,404 A | 3/1998 | Brody |
| 5,726,944 A | 3/1998 | Pelley et al. |
| 5,731,212 A | 3/1998 | Gavin et al. |
| 5,744,366 A | 4/1998 | Kricka et al. |
| 5,747,666 A | 5/1998 | Willis |

| | | | | | |
|---|---|---|---|---|---|
| 5,750,015 A | 5/1998 | Soane et al. | 5,989,402 A | 11/1999 | Chow et al. |
| 5,755,942 A | 5/1998 | Zanzucchi et al. | 5,992,820 A | 11/1999 | Fare et al. |
| 5,763,262 A | 6/1998 | Wong et al. | 5,993,611 A | 11/1999 | Moroney, III et al. |
| 5,770,029 A | 6/1998 | Nelson et al. | 5,993,750 A | 11/1999 | Ghosh et al. |
| 5,770,388 A | 6/1998 | Vorpahl | 5,997,708 A | 12/1999 | Craig |
| 5,772,966 A | 6/1998 | Maracas et al. | 6,001,229 A | 12/1999 | Ramsey |
| 5,779,868 A | 7/1998 | Parce et al. | 6,001,231 A | 12/1999 | Kopf-Sill |
| 5,787,032 A | 7/1998 | Heller et al. | 6,001,307 A | 12/1999 | Naka et al. |
| 5,788,814 A | 8/1998 | Sun et al. | 6,004,515 A | 12/1999 | Parce et al. |
| 5,800,600 A | 9/1998 | Lima-Marques et al. | 6,007,690 A | 12/1999 | Nelson et al. |
| 5,800,690 A | 9/1998 | Chow et al. | 6,010,607 A | 1/2000 | Ramsey |
| 5,804,436 A | 9/1998 | Okun et al. | 6,010,608 A | 1/2000 | Ramsey |
| D399,959 S | 10/1998 | Prokop et al. | 6,010,627 A | 1/2000 | Hood, III |
| 5,827,481 A | 10/1998 | Bente et al. | 6,012,902 A | 1/2000 | Parce |
| 5,842,106 A | 11/1998 | Thaler et al. | D420,747 S | 2/2000 | Dumitrescu et al. |
| 5,842,787 A | 12/1998 | Kopf-Sill et al. | D421,130 S | 2/2000 | Cohen et al. |
| 5,846,396 A | 12/1998 | Zanzucchi | 6,024,920 A | 2/2000 | Cunanan |
| 5,849,208 A | 12/1998 | Hayes et al. | D421,653 S | 3/2000 | Purcell |
| 5,849,486 A | 12/1998 | Heller et al. | 6,033,546 A | 3/2000 | Ramsey |
| 5,849,489 A | 12/1998 | Heller | 6,043,080 A | 3/2000 | Lipshutz et al. |
| 5,849,598 A | 12/1998 | Wilson et al. | 6,046,056 A | 4/2000 | Parce et al. |
| 5,852,495 A | 12/1998 | Parce | 6,048,734 A | 4/2000 | Burns et al. |
| 5,856,174 A | 1/1999 | Lipshutz et al. | 6,054,034 A | 4/2000 | Soane et al. |
| 5,858,187 A | 1/1999 | Ramsey et al. | 6,054,277 A | 4/2000 | Furcht et al. |
| 5,858,188 A | 1/1999 | Soane et al. | 6,056,860 A | 5/2000 | Amigo et al. |
| 5,863,502 A | 1/1999 | Southgate et al. | 6,057,149 A | 5/2000 | Burns et al. |
| 5,863,708 A | 1/1999 | Zanzucchi et al. | 6,062,261 A | 5/2000 | Jacobson et al. |
| 5,863,801 A | 1/1999 | Southgate et al. | 6,063,341 A | 5/2000 | Fassbind et al. |
| 5,866,345 A | 2/1999 | Wilding et al. | 6,063,589 A | 5/2000 | Kellogg et al. |
| 5,869,004 A | 2/1999 | Parce et al. | 6,068,752 A | 5/2000 | Dubrow et al. |
| 5,869,244 A | 2/1999 | Martin et al. | 6,071,478 A | 6/2000 | Chow |
| 5,872,010 A | 2/1999 | Karger et al. | 6,074,725 A | 6/2000 | Kennedy |
| 5,872,623 A | 2/1999 | Stabile et al. | 6,074,827 A | 6/2000 | Nelson et al. |
| 5,874,046 A | 2/1999 | Megerle | D428,497 S | 7/2000 | Lapeus et al. |
| 5,876,675 A | 3/1999 | Kennedy | 6,086,740 A | 7/2000 | Kennedy |
| 5,880,071 A | 3/1999 | Parce et al. | 6,096,509 A | 8/2000 | Okun et al. |
| 5,882,465 A | 3/1999 | McReynolds | 6,100,541 A | 8/2000 | Nagle et al. |
| 5,883,211 A | 3/1999 | Sassi et al. | 6,102,897 A | 8/2000 | Lang |
| 5,885,432 A | 3/1999 | Hooper et al. | 6,103,537 A | 8/2000 | Ullman et al. |
| 5,885,470 A | 3/1999 | Parce et al. | 6,106,685 A | 8/2000 | McBride et al. |
| 5,895,762 A | 4/1999 | Greenfield et al. | 6,110,343 A | 8/2000 | Ramsey et al. |
| 5,900,130 A | 5/1999 | Benregnu et al. | 6,123,205 A | 9/2000 | Dumitrescu et al. |
| 5,912,124 A | 6/1999 | Kumar | 6,123,798 A | 9/2000 | Gandhi et al. |
| 5,912,134 A | 6/1999 | Shartle | 6,130,098 A | 10/2000 | Handique et al. |
| 5,916,522 A | 6/1999 | Boyd et al. | 6,132,580 A | 10/2000 | Mathies et al. |
| 5,916,776 A | 6/1999 | Kumar | 6,132,684 A | 10/2000 | Marino |
| 5,919,646 A | 7/1999 | Okun et al. | 6,133,436 A | 10/2000 | Koster et al. |
| 5,919,711 A | 7/1999 | Boyd et al. | D433,759 S | 11/2000 | Mathis et al. |
| 5,922,591 A | 7/1999 | Anderson et al. | 6,143,250 A | 11/2000 | Tajima |
| 5,927,547 A | 7/1999 | Papen et al. | 6,149,787 A | 11/2000 | Chow et al. |
| 5,928,880 A | 7/1999 | Wilding et al. | 6,156,199 A | 12/2000 | Zuk, Jr. |
| 5,929,208 A | 7/1999 | Heller et al. | 6,158,269 A | 12/2000 | Dorenkott et al. |
| D413,391 S | 8/1999 | Lapeus et al. | 6,167,910 B1 | 1/2001 | Chow |
| 5,932,799 A | 8/1999 | Moles | 6,168,948 B1 | 1/2001 | Anderson et al. |
| 5,935,401 A | 8/1999 | Amigo | 6,171,850 B1 | 1/2001 | Nagle et al. |
| 5,939,291 A | 8/1999 | Loewy et al. | 6,174,675 B1 | 1/2001 | Chow et al. |
| 5,942,443 A | 8/1999 | Parce et al. | D438,311 S | 2/2001 | Yamanishi et al. |
| D413,677 S | 9/1999 | Dumitrescu et al. | 6,190,619 B1 | 2/2001 | Kilcoin et al. |
| 5,948,227 A | 9/1999 | Dubrow | D438,632 S | 3/2001 | Miller |
| 5,955,028 A | 9/1999 | Chow | 6,197,595 B1 | 3/2001 | Anderson et al. |
| 5,955,029 A | 9/1999 | Wilding et al. | 6,211,989 B1 | 4/2001 | Wulf et al. |
| 5,957,579 A | 9/1999 | Kopf-Sill et al. | 6,213,151 B1 | 4/2001 | Jacobson et al. |
| 5,958,203 A | 9/1999 | Parce et al. | 6,221,600 B1 | 4/2001 | MacLeod et al. |
| 5,958,694 A | 9/1999 | Nikiforov | 6,228,635 B1 | 5/2001 | Armstrong et al. |
| 5,959,221 A | 9/1999 | Boyd et al. | 6,232,072 B1 | 5/2001 | Fisher |
| 5,959,291 A | 9/1999 | Jensen | 6,235,175 B1 | 5/2001 | Dubrow et al. |
| 5,964,995 A | 10/1999 | Nikiforov et al. | 6,235,313 B1 | 5/2001 | Mathiowitz et al. |
| 5,964,997 A | 10/1999 | McBride | 6,235,471 B1 | 5/2001 | Knapp et al. |
| 5,965,001 A | 10/1999 | Chow et al. | 6,236,581 B1 | 5/2001 | Foss et al. |
| 5,965,410 A | 10/1999 | Chow et al. | 6,251,343 B1 | 6/2001 | Dubrow et al. |
| 5,965,886 A | 10/1999 | Sauer et al. | 6,254,826 B1 | 7/2001 | Acosta et al. |
| 5,968,745 A | 10/1999 | Thorp et al. | 6,259,635 B1 | 7/2001 | Khouri et al. |
| 5,972,187 A | 10/1999 | Parce et al. | 6,261,431 B1 | 7/2001 | Mathies et al. |
| 5,973,138 A | 10/1999 | Collis | 6,267,858 B1 | 7/2001 | Parce et al. |
| D417,009 S | 11/1999 | Boyd | 6,271,021 B1 | 8/2001 | Burns et al. |
| 5,976,336 A | 11/1999 | Dubrow et al. | 6,274,089 B1 | 8/2001 | Chow et al. |
| 5,980,704 A | 11/1999 | Cherukuri et al. | 6,280,967 B1 | 8/2001 | Ransom et al. |
| 5,980,719 A | 11/1999 | Cherukuri et al. | 6,281,008 B1 | 8/2001 | Komai et al. |
| 5,981,735 A | 11/1999 | Thatcher et al. | 6,284,113 B1 | 9/2001 | Bjornson et al. |

| | | |
|---|---|---|
| 6,287,254 B1 | 9/2001 | Dodds |
| 6,287,774 B1 | 9/2001 | Kikiforov |
| 6,291,248 B1 | 9/2001 | Haj-Ahmad |
| 6,294,063 B1 | 9/2001 | Becker et al. |
| 6,302,134 B1 | 10/2001 | Kellogg et al. |
| 6,302,304 B1 | 10/2001 | Spencer |
| 6,303,343 B1 | 10/2001 | Kopf-Sill |
| 6,306,273 B1 | 10/2001 | Wainright et al. |
| 6,306,590 B1 | 10/2001 | Mehta et al. |
| 6,319,469 B1 | 11/2001 | Mian et al. |
| 6,322,683 B1 | 11/2001 | Wolk et al. |
| 6,326,083 B1 | 12/2001 | Yang et al. |
| 6,326,211 B1 | 12/2001 | Anderson et al. |
| 6,334,980 B1 | 1/2002 | Hayes et al. |
| 6,337,435 B1 | 1/2002 | Chu et al. |
| 6,353,475 B1 | 3/2002 | Jensen et al. |
| 6,358,387 B1 | 3/2002 | Kopf-sill et al. |
| 6,366,924 B1 | 4/2002 | Parce |
| 6,368,871 B1 | 4/2002 | Christel et al. |
| 6,370,206 B1 | 4/2002 | Schenk |
| 6,375,185 B1 | 4/2002 | Lin |
| 6,375,901 B1 | 4/2002 | Robotti et al. |
| 6,379,884 B2 | 4/2002 | Wada et al. |
| 6,379,929 B1 | 4/2002 | Burns et al. |
| 6,379,974 B1 | 4/2002 | Parce et al. |
| 6,391,541 B1 | 5/2002 | Petersen et al. |
| 6,391,623 B1 | 5/2002 | Besemer et al. |
| 6,395,161 B1 | 5/2002 | Schneider et al. |
| 6,398,956 B1 | 6/2002 | Coville et al. |
| 6,399,025 B1 | 6/2002 | Chow |
| 6,399,389 B1 | 6/2002 | Parce et al. |
| 6,399,952 B1 | 6/2002 | Majer et al. |
| 6,401,552 B1 | 6/2002 | Elkins |
| 6,403,338 B1 | 6/2002 | Knapp et al. |
| 6,408,878 B2 | 6/2002 | Unger et al. |
| 6,413,401 B1 | 7/2002 | Chow et al. |
| 6,416,642 B1 | 7/2002 | Alajoki et al. |
| 6,420,143 B1 | 7/2002 | Kopf-Sill |
| 6,425,972 B1 | 7/2002 | Mcreynolds |
| 6,428,987 B2 | 8/2002 | Franzen |
| 6,430,512 B1 | 8/2002 | Gallagher |
| 6,432,366 B2 | 8/2002 | Ruediger et al. |
| 6,440,725 B1 | 8/2002 | Pourahmadi et al. |
| 6,444,461 B1 | 9/2002 | Knapp et al. |
| 6,447,661 B1 | 9/2002 | Chow et al. |
| 6,447,727 B1 | 9/2002 | Parce et al. |
| 6,448,064 B1 | 9/2002 | Vo-Dinh et al. |
| 6,453,928 B1 | 9/2002 | Kaplan et al. |
| 6,465,257 B1 | 10/2002 | Parce et al. |
| 6,468,761 B2 | 10/2002 | Yang et al. |
| 6,472,141 B2 | 10/2002 | Nikiforov |
| 6,475,364 B1 | 11/2002 | Dubrow et al. |
| 6,488,897 B2 | 12/2002 | Dubrow et al. |
| 6,495,104 B1 | 12/2002 | Unno et al. |
| 6,498,497 B1 | 12/2002 | Chow et al. |
| 6,500,323 B1 | 12/2002 | Chow et al. |
| 6,500,390 B1 | 12/2002 | Boulton et al. |
| 6,506,609 B1 | 1/2003 | Wada et al. |
| 6,509,193 B1 | 1/2003 | Tajima |
| 6,511,853 B1 | 1/2003 | Kopf-sill et al. |
| 6,515,753 B2 | 2/2003 | Maher |
| 6,517,783 B2 | 2/2003 | Horner et al. |
| 6,520,197 B2 | 2/2003 | Deshmukh et al. |
| 6,521,188 B1 | 2/2003 | Webster |
| 6,524,456 B1 | 2/2003 | Ramsey et al. |
| 6,524,790 B1 | 2/2003 | Kopf-sill et al. |
| 6,534,295 B2 | 3/2003 | Tai et al. |
| 6,537,771 B1 | 3/2003 | Farinas et al. |
| 6,540,896 B1 | 4/2003 | Manz et al. |
| 6,544,734 B1 | 4/2003 | Briscoe et al. |
| 6,547,942 B1 | 4/2003 | Parce et al. |
| 6,555,389 B1 | 4/2003 | Ullman et al. |
| 6,556,923 B2 | 4/2003 | Gallagher et al. |
| 6,558,916 B2 | 5/2003 | Veerapandian et al. |
| 6,558,945 B1 | 5/2003 | Kao |
| 6,569,607 B2 | 5/2003 | Mcreynolds |
| 6,572,830 B1 | 6/2003 | Burdon et al. |
| 6,575,188 B2 | 6/2003 | Parunak |
| 6,576,459 B2 | 6/2003 | Miles et al. |
| 6,579,453 B1 | 6/2003 | Bächler et al. |
| 6,589,729 B1 | 7/2003 | Chan et al. |
| 6,592,821 B1 | 7/2003 | Wada et al. |
| 6,597,450 B1 | 7/2003 | Andrews et al. |
| 6,602,474 B1 | 8/2003 | Tajima |
| 6,613,211 B1 | 9/2003 | Mccormick et al. |
| 6,613,512 B1 | 9/2003 | Kopf-Sill et al. |
| 6,613,580 B1 | 9/2003 | Chow et al. |
| 6,613,581 B1 | 9/2003 | Wada et al. |
| 6,620,625 B2 | 9/2003 | Wolk et al. |
| 6,623,860 B2 | 9/2003 | Hu et al. |
| 6,627,406 B1 | 9/2003 | Singh et al. |
| 6,632,655 B1 | 10/2003 | Mehta et al. |
| 6,649,358 B1 | 11/2003 | Parce et al. |
| 6,664,104 B2 | 12/2003 | Pourahmadi et al. |
| 6,669,831 B2 | 12/2003 | Chow et al. |
| 6,670,153 B2 | 12/2003 | Stern |
| 6,681,616 B2 | 1/2004 | Spaid et al. |
| 6,685,813 B2 | 2/2004 | Williams et al. |
| 6,692,700 B2 | 2/2004 | Handique |
| 6,695,009 B2 | 2/2004 | Chien et al. |
| 6,706,519 B1 | 3/2004 | Kellogg et al. |
| 6,730,206 B2 | 5/2004 | Ricco et al. |
| 6,733,645 B1 | 5/2004 | Chow |
| 6,734,401 B2 | 5/2004 | Bedingham et al. |
| 6,740,518 B1 | 5/2004 | Duong et al. |
| 6,752,966 B1 | 6/2004 | Chazan |
| 6,756,019 B1 | 6/2004 | Dubrow et al. |
| 6,766,817 B2 | 7/2004 | Dias da Silva |
| 6,773,567 B1 | 8/2004 | Wolk |
| 6,777,184 B2 | 8/2004 | Nikiforov et al. |
| 6,783,962 B1 | 8/2004 | Olander et al. |
| 6,787,015 B2 | 9/2004 | Lackritz et al. |
| 6,787,016 B2 | 9/2004 | Tan et al. |
| 6,790,328 B2 | 9/2004 | Jacobson et al. |
| 6,790,330 B2 | 9/2004 | Gascoyne et al. |
| 6,811,668 B1 | 11/2004 | Berndt et al. |
| 6,818,113 B2 | 11/2004 | Williams et al. |
| 6,819,027 B2 | 11/2004 | Saraf |
| 6,824,663 B1 | 11/2004 | Boone |
| 6,827,831 B1 | 12/2004 | Chow et al. |
| 6,827,906 B1 | 12/2004 | Bjornson et al. |
| 6,852,287 B2 * | 2/2005 | Ganesan ....................... 422/502 |
| 6,858,185 B1 | 2/2005 | Kopf-sill et al. |
| 6,859,698 B2 | 2/2005 | Schmeisser |
| 6,861,035 B2 | 3/2005 | Pham et al. |
| 6,878,540 B2 | 4/2005 | Pourahmadi et al. |
| 6,878,755 B2 | 4/2005 | Singh et al. |
| 6,884,628 B2 | 4/2005 | Hubbell et al. |
| 6,887,693 B2 | 5/2005 | McMillan et al. |
| 6,893,879 B2 | 5/2005 | Petersen et al. |
| 6,906,797 B1 | 6/2005 | Kao et al. |
| 6,908,594 B1 | 6/2005 | Schaevitz et al. |
| 6,911,183 B1 | 6/2005 | Handique et al. |
| 6,914,137 B2 | 7/2005 | Baker |
| 6,915,679 B2 | 7/2005 | Chien et al. |
| 6,918,404 B2 | 7/2005 | da Silva |
| 6,939,451 B2 | 9/2005 | Zhao et al. |
| 6,942,771 B1 | 9/2005 | Kayyem |
| 6,958,392 B2 | 10/2005 | Fomovskaia et al. |
| 6,964,747 B2 | 11/2005 | Banerjee et al. |
| 6,984,516 B2 | 1/2006 | Briscoe et al. |
| 7,004,184 B2 | 2/2006 | Handique et al. |
| 7,010,391 B2 | 3/2006 | Handique et al. |
| 7,037,416 B2 | 5/2006 | Parce et al. |
| 7,066,586 B2 | 6/2006 | da Silva |
| 7,118,910 B2 | 10/2006 | Unger et al. |
| 7,148,043 B2 | 12/2006 | Kordunsky et al. |
| 7,169,277 B2 | 1/2007 | Ausserer et al. |
| 7,169,618 B2 | 1/2007 | Skould |
| 7,192,557 B2 | 3/2007 | Wu et al. |
| 7,235,406 B1 | 6/2007 | Woudenberg et al. |
| 7,270,786 B2 | 9/2007 | Parunak et al. |
| 7,323,140 B2 | 1/2008 | Handique et al. |
| 7,332,130 B2 | 2/2008 | Handique |
| 7,338,760 B2 | 3/2008 | Gong et al. |
| 7,351,377 B2 | 4/2008 | Chazan et al. |
| 7,374,949 B2 | 5/2008 | Kuriger |
| 7,390,460 B2 | 6/2008 | Osawa et al. |

| | | |
|---|---|---|
| 7,476,313 B2 | 1/2009 | Siddiqi |
| 7,494,770 B2 | 2/2009 | Wilding et al. |
| 7,553,671 B2 | 6/2009 | Sinclair et al. |
| 7,674,431 B2 * | 3/2010 | Ganesan ............... 422/502 |
| 2001/0023848 A1 | 9/2001 | Gjerde et al. |
| 2001/0038450 A1 | 11/2001 | McCaffrey et al. |
| 2001/0046702 A1 | 11/2001 | Schembri |
| 2001/0055765 A1 | 12/2001 | O'Keefe et al. |
| 2002/0001848 A1 | 1/2002 | Bedingham et al. |
| 2002/0009015 A1 | 1/2002 | Laugharn, Jr. et al. |
| 2002/0015667 A1 | 2/2002 | Chow |
| 2002/0021983 A1 | 2/2002 | Comte et al. |
| 2002/0037499 A1 | 3/2002 | Quake et al. |
| 2002/0039783 A1 | 4/2002 | McMillan et al. |
| 2002/0053399 A1 | 5/2002 | Soane et al. |
| 2002/0054835 A1 | 5/2002 | Robotti et al. |
| 2002/0055167 A1 | 5/2002 | Pourahmadi et al. |
| 2002/0060156 A1 | 5/2002 | Mathies et al. |
| 2002/0068357 A1 | 6/2002 | Mathies et al. |
| 2002/0141903 A1 | 10/2002 | Parunak et al. |
| 2002/0142471 A1 | 10/2002 | Handique et al. |
| 2002/0143297 A1 | 10/2002 | Francavilla et al. |
| 2002/0143437 A1 | 10/2002 | Handique et al. |
| 2002/0155477 A1 | 10/2002 | Ito |
| 2002/0169518 A1 | 11/2002 | Luoma et al. |
| 2002/0187557 A1 | 12/2002 | Hobbs et al. |
| 2003/0019522 A1 | 1/2003 | Parunak |
| 2003/0049833 A1 | 3/2003 | Chen et al. |
| 2003/0064507 A1 | 4/2003 | Gallagher et al. |
| 2003/0070677 A1 | 4/2003 | Handique et al. |
| 2003/0073106 A1 | 4/2003 | Johansen et al. |
| 2003/0083686 A1 | 5/2003 | Freeman et al. |
| 2003/0087300 A1 | 5/2003 | Knapp et al. |
| 2003/0127327 A1 | 7/2003 | Kurnik |
| 2003/0136679 A1 | 7/2003 | Bohn et al. |
| 2003/0186295 A1 | 10/2003 | Colin et al. |
| 2003/0199081 A1 | 10/2003 | Wilding et al. |
| 2003/0211517 A1 | 11/2003 | Carulli et al. |
| 2004/0014238 A1 | 1/2004 | Krug et al. |
| 2004/0063217 A1 | 4/2004 | Webster et al. |
| 2004/0072278 A1 | 4/2004 | Chou et al. |
| 2004/0072375 A1 | 4/2004 | Gjerde et al. |
| 2004/0151629 A1 | 8/2004 | Pease et al. |
| 2004/0157220 A1 | 8/2004 | Kurnool et al. |
| 2004/0161788 A1 | 8/2004 | Chen et al. |
| 2004/0189311 A1 | 9/2004 | Glezer et al. |
| 2004/0209354 A1 | 10/2004 | Mathies et al. |
| 2004/0219070 A1 | 11/2004 | Handique |
| 2004/0240097 A1 | 12/2004 | Evans |
| 2005/0041525 A1 | 2/2005 | Pugia et al. |
| 2005/0048540 A1 | 3/2005 | Inami et al. |
| 2005/0058574 A1 | 3/2005 | Bysouth et al. |
| 2005/0084424 A1 | 4/2005 | Ganesan et al. |
| 2005/0106066 A1 | 5/2005 | Saltsman et al. |
| 2005/0152808 A1 | 7/2005 | Ganesan |
| 2005/0202504 A1 | 9/2005 | Anderson et al. |
| 2005/0208676 A1 | 9/2005 | Kahatt |
| 2005/0220675 A1 | 10/2005 | Reed et al. |
| 2005/0227269 A1 | 10/2005 | Lloyd et al. |
| 2005/0233370 A1 | 10/2005 | Ammann et al. |
| 2005/0272079 A1 | 12/2005 | Burns et al. |
| 2006/0041058 A1 | 2/2006 | Yin et al. |
| 2006/0057039 A1 | 3/2006 | Morse et al. |
| 2006/0057629 A1 | 3/2006 | Kim |
| 2006/0094108 A1 | 5/2006 | Yoder et al. |
| 2006/0133965 A1 | 6/2006 | Tajima et al. |
| 2006/0134790 A1 | 6/2006 | Tanaka et al. |
| 2006/0148063 A1 | 7/2006 | Fauzzi et al. |
| 2006/0165558 A1 | 7/2006 | Witty et al. |
| 2006/0166233 A1 | 7/2006 | Wu et al. |
| 2006/0177376 A1 | 8/2006 | Tomalia et al. |
| 2006/0177855 A1 | 8/2006 | Utermohlen et al. |
| 2006/0183216 A1 | 8/2006 | Handique et al. |
| 2006/0207944 A1 | 9/2006 | Siddiqi |
| 2007/0104617 A1 | 5/2007 | Coulling et al. |
| 2007/0215554 A1 | 9/2007 | Kreuwel et al. |
| 2007/0231213 A1 | 10/2007 | Prabhu et al. |
| 2007/0292941 A1 | 12/2007 | Handique et al. |
| 2008/0050804 A1 | 2/2008 | Handique et al. |
| 2008/0075634 A1 | 3/2008 | Herchenbach et al. |
| 2008/0095673 A1 | 4/2008 | Xu |
| 2009/0129978 A1 | 5/2009 | Wilson et al. |
| 2009/0130745 A1 | 5/2009 | Williams et al. |
| 2009/0131650 A1 | 5/2009 | Brahmasandra et al. |
| 2009/0134069 A1 | 5/2009 | Handique |
| 2009/0136385 A1 | 5/2009 | Handique et al. |
| 2009/0221059 A1 | 9/2009 | Williams et al. |
| 2010/0009351 A1 | 1/2010 | Brahmasandra et al. |

FOREIGN PATENT DOCUMENTS

| | | |
|---|---|---|
| DE | 19929734 A1 | 12/1999 |
| EP | 0766256 A1 | 4/1997 |
| FR | 2672301 | 7/1992 |
| FR | 2795426 | 12/2000 |
| JP | 58212921 A | 12/1983 |
| JP | H07-290706 | 11/1995 |
| JP | 2000-514928 | 11/2000 |
| JP | 2001-502790 | 2/2001 |
| JP | 2001-515216 | 9/2001 |
| JP | 2001-527220 | 12/2001 |
| JP | 2003-500674 | 1/2003 |
| JP | 2005-514718 | 5/2005 |
| JP | 2005-204661 | 8/2005 |
| WO | WO 88/06633 | 9/1988 |
| WO | WO 92/05443 | 4/1992 |
| WO | WO 98/00231 | 1/1998 |
| WO | WO 98/22625 | 5/1998 |
| WO | WO 98/53311 | 11/1998 |
| WO | WO 99/01688 | 1/1999 |
| WO | WO 99/09042 | 2/1999 |
| WO | WO 99/12016 | 3/1999 |
| WO | WO 99/33559 | 7/1999 |
| WO | WO 01/05510 | 1/2001 |
| WO | WO 01/14931 | 3/2001 |
| WO | WO 01/27614 | 4/2001 |
| WO | WO 01/28684 | 4/2001 |
| WO | WO 01/41931 | 6/2001 |
| WO | WO 01/54813 | 8/2001 |
| WO | WO 01/89681 | 11/2001 |
| WO | WO 02/072264 | 9/2002 |
| WO | WO 02/078845 | 10/2002 |
| WO | WO 03/012325 | 2/2003 |
| WO | WO 03/012406 | 2/2003 |
| WO | WO 03/048295 | 6/2003 |
| WO | WO 03/055605 | 7/2003 |
| WO | WO 2004/007081 | 1/2004 |
| WO | WO 2004/074848 | 9/2004 |
| WO | WO 2005/011867 | 2/2005 |
| WO | WO 2005/108620 | 11/2005 |
| WO | WO 2006/079082 | 7/2006 |
| WO | WO 2008/060604 | 5/2008 |

OTHER PUBLICATIONS

Brahmassandra, et al., On-Chip DNA Detection in Microfabricated Separation Systems, Part of the SPIE Conference on Microfludic Devices and Systems, 1998, Santa Clara, California, vol. 3515, pp. 242-251.

Breadmore, M.C. et al., "Microchip-Based Purification of DNA from Biological Samples", Anal. Chem., vol. 75 (2003), pp. 1880-1886.

Brody, et al., Diffusion-Based Extraction in a Microfabricated Device, Sensors and Actuators Elsevier, 1997, vol. A58, No. 1, pp. 13-18.

Broyles, et al., "Sample Filtration, Concentration, and Separation Integrated on Microfluidic Devices" Analytical Chemistry (American Chemical Society), vol. 75 No. 11: pp. 2761-2767.

Burns et al., "An Integrated Nanoliter DNA Analysis Device", Science 282:484-487 (1998).

Carlen et al., "Paraffin Actuated Surface Micromachined Valve," in IEEE MEMS 2000 Conference, p. 381-385, Miyazaki, Japan, Jan. 2000.

Chung, Y. et al., "Microfluidic chip for high efficiency DNA extraction", Miniaturisation for Chemistry, Biology & Bioengineering, vol. 4, No. 2 (Apr. 2004), pp. 141-147.

Handique, K. et al, "Microflidic flow control using selective hydrophobic patterning", SPIE, vol. 3224, pp. 185-194 (1997).

Handique, K. et al., "Nanoliter-volume discrete drop injection and pumping in microfabricated chemical analysis systems", Solid-State Sensor and Actuator Workshop (Hilton Head, South Carolina, Jun. 8-11, 1998) pp. 346-349.

Handique, K. et al., "Mathematical Modeling of Drop Mixing in a Slit-Type Micochannel", J. Micromech. Microeng., 11:548-554 (2001).

Handique, K. et al., "Nanoliter Liquid Metering in Microchannels Using Hydrophobic Patterns", Anal. Chem., 72:4100-4109 (2000).

Handique, K., On-Chip Thermopneumatic Pressure for Discrete Drop Pumping, Analytical Chemistry, Apr. 15, 2001, vol. 73, Issue 8, pp. 1831-1838.

He, et al., Microfabricated Filters for Microfludic Analytical Systems, Analytical Chemistry, American Chemical Society, 1999, vol. 71, No. 7, pp. 1464-1468.

Ibrahim, et al., Real-Time Microchip PCR for Detecting Single-Base Differences in Viral and Human DNA, Analytical Chemistry, American Chemical Society, 1998, vol. 70, No. 9, pp. 2013-2017.

Khandurina, et al., Microfabricated Porous Membrane Structure for Sample Concentraction and Electrophoretic Analysis, Analytical Chemistry American Chemical Society, 1999, vol. 71, No. 9, pp. 1815-1819.

Kopp, et al., Chemical Amplification: Continuous-Flow PCR on a Chip, www.sciencemag.org, 1998, vol. 280, pp. 1046-1048.

Kutter, et al., Solid Phase Extraction on Microfludic Devices, J. Microcolumn Separations, John Wiley & Sons, Inc., 2000, vol. 12, No. 2, pp. 93-97.

Lagally, et al., Single-Molecule DNA Amplification and Analysis in an Integrated Microfluidic Device, Analytical Chemistry, American Chemical Society, 2001, vol. 73, No. 3 pp. 565-570.

Livache, T. et al., "Polypyrrole DNA chip on a Silicon Device: Example of Hepatitis C Virus Genotyping", Analytical Biochemistry, vol. 255 (1998), pp. 188-194.

Northrup, et al., A Miniature Analytical Instrument for Nucleic Acids Based on Micromachined Silicon Reaction Chambers, Analytical Chemistry, American Chemical Society, 1998, vol. 70, No. 5, pp. 918-922.

Oleschuk, et al., Trapping of Bead-Based Reagents within Microfluidic Systems,: On-Chip Solid-Phase Extraction and Electrochromatography, Analytical Chemistry, American Chemical Society, 2000, vol. 72, No. 3, pp. 585-590.

Ross, et al., Analysis of DNA Fragments from Conventional and Microfabricated PCR Devices Using Delayed Extraction MALDI-TOF Mass Spectrometry, Analytical Chemistry, American Chemical Society, 1998, vol. 70, No. 10, pp. 2067-2073.

Shoffner, et al., Chip PCR.I. Surface Passivation of Microfabricated Silicon-Glass Chips for PCR, Nucleic Acids Research, Oxford University Press, 1996, vol. 24, No. 2, 375-379.

Waters, et al., Microchip Device for Cell Lysis, Multiplex PCR Amplification, and Electrophoretic Sizing, Analytical Chemistry, American Chemical Society, 1998, vol. 70, No. 1, pp. 158-162.

Weigl, et al., Microfluidic Diffusion-Based Separation and Detection, www.sciencemag.org, 1999, vol. 283, pp. 346-347.

Yoza, et al., DNA extraction using bacterial magnetic particles modified with hyperbranched polyamidoamine dendrimer, Mar. 20, 2003, vol. 101, No. 3, 219-228.

Mascini et al., "DNA electrochemical biosensors", Fresenius J. Anal. Chem., 369: 15-22, (2001).

Plambeck et al., "Electrochemical Studies of Antitumor Antibiotics", J. Electrochem Soc.: Electrochemical Science and Technology, pp. 2556-2563, (12/84).

Wang, "Survey and Summary, from DNA Biosensors to Gene Chips", Nucleic Acids Research, 28(16):3011-3016, (2000).

* cited by examiner

METHOD OF CONTROLLING A MICROFLUIDIC DEVICE HAVING A REDUCED NUMBER OF INPUT AND OUTPUT CONNECTIONS

CROSS-REFERENCE TO RELATED APPLICATIONS

This application is a continuation of U.S. patent application Ser. No. 12/717,075, entitled "Microfluidic Devices Having a Reduced Number of Input and Output Connections," filed Mar. 3, 2010; which is a continuation of U.S. patent application Ser. No. 10/489,404, entitled "Microfluidic Devices Having a Reduced Number of Input and Output Connections," filed Mar. 7, 2005, now U.S. Pat. No. 7,674,431, issued Mar. 9, 2010; which claims the benefit of PCT Application No. PCT/US02/29012, entitled "Microfluidic Devices Having a Reduced Number of Input and Output Connections," filed Sep. 12, 2002; which is a continuation in part of U.S. patent application Ser. No. 09/949,763, entitled "Microfluidic Devices Having a Reduced Number of Input and Output Connections," filed Sep. 12, 2001, now U.S. Pat. No. 6,852,287, issued Feb. 8, 2005. The entire disclosure of each of the above-referenced applications is hereby incorporated by reference in its entirety.

BACKGROUND OF THE INVENTION

1. Field of the Invention

The present invention relates to microfluidic devices, and more particularly to techniques for reducing the number of input and output connections required to connect a microfluidic device to an external controller for controlling the microfluidic device.

2. Description of the Related Art

Micro/nano technology devices are known in the art as devices with components on the scale of 1 μm to 100 s of μm that cooperate to perform various desired functions. In particular, microfluidic devices are micro/nano technology devices that perform fluid handling functions which, for example, cooperate to carry out a chemical or biochemical reaction or analysis.

Microfluidic devices include a variety of components for manipulating and analyzing the fluid within the devices. Typically, these elements are microfabricated from substrates made of silicon, glass, ceramic, plastic, and/or quartz. These various fluid-processing components are linked by microchannels, etched into the same substrate, through which the fluid flows under the control of a fluid propulsion mechanism. Electronic components may also be fabricated on the substrate, allowing sensors and controlling circuitry to be incorporated in the same device. Because all of the components are made using conventional photolithographic techniques, multi-component devices can be readily assembled into complex, integrated systems.

Most microfluidic devices in the prior art are based on fluid flowing through micro-scale passages and chambers, either continuously or in relatively large aliquots. Fluid flow is usually initiated and controlled by electro-osmotic and electrophoretic forces. See, e.g., U.S. Pat. No. 5,632,876, issued Apr. 27, 1997 and entitled "Apparatus and Methods for Controlling Fluid Flow in Microchannels;" U.S. Pat. No. 5,992,820, issued Nov. 30, 1999 and entitled "Flow Control in Microfluidics Devices by Controlled Bubble Formation;" U.S. Pat. No. 5,637,469, issued Jun. 10, 1997 and entitled "Methods and Apparatus for the Detection of an Analyte Utilizing Mesoscale Flow Systems;" U.S. Pat. No. 5,800,690, issued Sep. 1, 1998 and entitled "Variable Control of Electroosmotic and/or Electrophoretic Forces Within a Fluid-Containing Structure Via Electrical Forces;" and U.S. Pat. No. 6,001,231, issued Dec. 14, 1999 and entitled "Methods and Systems for Monitoring and Controlling Fluid Flow Rates in Microfluidic Systems." See also products from, e.g., Orchid, Inc. (www.orchid.com) and Caliper Technologies, Inc. (www.calipertech.com).

Microfluidic devices that manipulate very small aliquots of fluids (know herein as "micro-droplets") in micro-scale passages rely principally on pressure and other non-electric forces to move the liquid volume. These devices are advantageous because smaller volumes of reagents are required and because non-electric propulsion forces can be generated using relatively small voltages, on the same order of magnitude as voltages required by standard microelectronic components. See, i.e. the following patents, the contents of which are incorporated herein in their entirety by reference: U.S. Pat. No. 6,057,149, issued May 2, 2000 and entitled "Microscale Devices And Reactions In Microscale Devices;" U.S. Pat. No. 6,048,734, issued Apr. 11, 2000 and entitled "Thermal Microvalves in a Fluid Flow Method;" and U.S. Pat. No. 6,130,098, issued Oct. 10, 2000. (Citation or identification of any reference in this section or any section of this application shall not be construed that such reference is available as prior art to the present invention).

U.S. Pat. No. 6,130,098 ("the '098 patent"), for example, discloses microfluidic devices that include micro-droplet channels for transporting fluid droplets through a fluid processing system. The system includes a variety of micro-scale components for processing the fluid droplets, including micro-reaction chambers, electrophoresis modules, and detectors (such as radiation detectors). In some embodiments, the devices also include air chambers coupled to resistive heaters to internally generate air pressure to automatically withdraw a measured volume of fluid from an input port, and to propel the measured micro-droplet through the microfluidic device.

These components are connected to input/output (I/O) pins at the edge of the micro-fluid device which mate with corresponding I/O pins of the external controller. The external controller operates these components by sending and receiving control signals via the input/output pins. For example, a control device, external to the microfluidic device, activates a resistive heater within a microfluidic device by supplying current to the heater through the input/output pins. Microfluidic devices can include a large number of such components which are controlled by external devices. Accordingly, an object of the present invention is to reduce the number of input/output pins required for controlling such microfluidic devices from such external controllers.

SUMMARY OF THE INVENTION

The invention relates generally to techniques for reducing the number of input/output connections required to connect a microfluidic substrate to an external controller for controlling the substrate. In one aspect, the invention involves a microfluidic processing device fabricated on a substrate having a plurality of N independently controllable components, (e.g., resistive heating elements) each having at least two terminals. The substrate includes a plurality of input/output contacts for connecting the substrate to an external controller, and a plurality of leads for connecting the contacts to the terminals of the components.

The leads are arranged to allow the external controller to supply control signals to the terminals of the components via the contacts using substantially fewer contacts than the total number of component terminals. For example, in one embodiment, each lead connects a corresponding contact to a plurality of terminals to allow the controller to supply to signals to the terminals without requiring a separate contact for each terminal. The number of contacts may be less than about 50% of the number of components. However, to assure that the components can each be controlled independently of the others, the leads are also arranged so that each component's terminals are connected to a unique combination of contacts. Thus, the external controller can activate a selected component by supplying control signals to the combination of contacts uniquely associated with that component.

The substrate of the microfabricated device preferably includes elements such as valves or pumps, which cooperate to manipulate fluid within channels and chambers of the substrate. For example, the substrate may include a thermally actuated valve. At least one of the N independently controllable components is a heating element in thermal communication with the thermally actuated valve. Actuation of the heating element actuates the valve, whereupon the valve opens or closes. The substrate may include a plurality of thermally actuated valves and a plurality of the N independently controllable components are heating elements in thermal communication with respective thermally actuated valves.

The substrate may include a thermally actuated pump comprising a volume of fluid. At least one of the N independently controllable components is a heating element in thermal communication with the volume of fluid, whereby actuation of the heating element heats the fluid and actuates the thermally actuated pump. For example, the fluid may be a gas, whereby expansion of the gas propels a microfluidic sample along a channel of the substrate. The substrate may include a plurality of thermally actuated pumps. Fluid of each pump is in thermal communication with at least one heating element.

The substrate may include at least one microfabricated reaction chamber, such as a chamber configured to perform a polymerase chain reaction. At least one of the N independently controllable components is a heating element in thermal communication with the reaction chamber, whereby actuation of the heating element may raise a temperature of material present in the reaction chamber. At least one of the N independently controllable components may be a heat sensor in thermal communication with the reaction chamber, whereby the temperature of the material present in the reaction chamber may be determined.

BRIEF DESCRIPTION OF THE DRAWINGS

The present invention may be understood more fully by reference to the following detailed description of the preferred embodiment of the present invention, illustrative examples of specific embodiments of the invention, and the appended figures wherein.

DETAILED DESCRIPTION OF THE PREFERRED EMBODIMENT

System Overview

Figure 1:
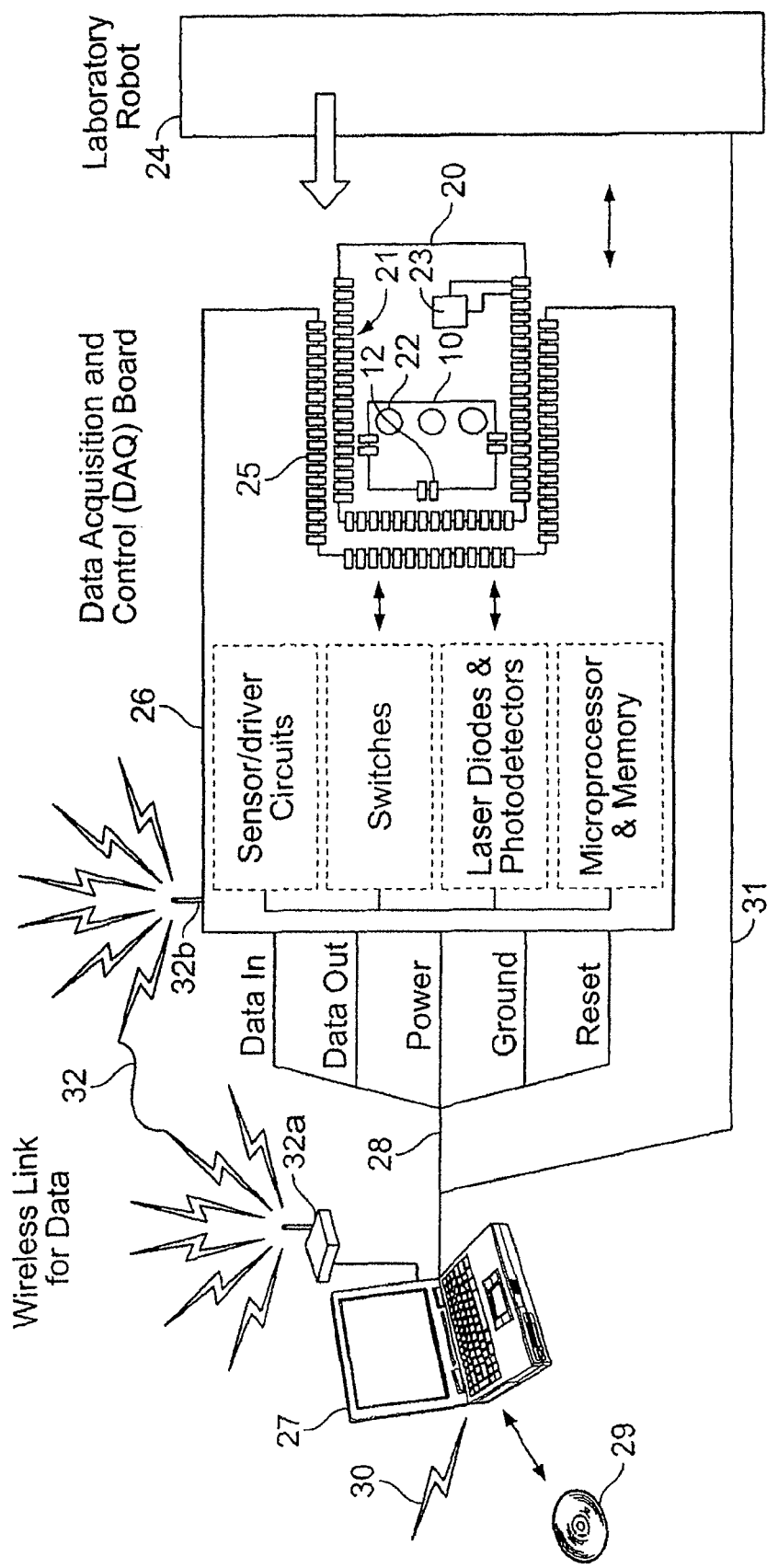
FIG. 1 illustrates a microfluidic control system having a discrete droplet microfluidic processing device, an external controller, and a general purpose computer.

FIG. 1 depicts a microfluidic processing system that includes a microfluidic substrate 10, a chip carrier cartridge 20, a data acquisition and control board ("DAQ") 26, and a portable computer 27 such as a laptop or palmtop computer. Microfluidic substrate 10 has microchannels and fluid control elements formed in a solid substrate such as silicon, glass, or other suitable material, preferably microfabricated using conventional photolithographic techniques. The microfluidic substrate 10 is mounted on the chip carrier cartridge 20. The microfluidic substrate 10 has electrical and optical connections 12 with the chip carrier cartridge for carrying electrical and optical signals between the microfluidic substrate and the chip carrier. For example, the electrical connections can be formed with well-known wire bonding techniques. Furthermore, the chip carrier cartridge 20 has electrical and optical contacts 21 for carrying electrical and optical signals between the microfluidic substrate and the data acquisition board 26.

The chip carrier cartridge 20 is shown being inserted into (or removed from) an interface hardware receptacle of DAQ 26 having electrical and optical contacts 25 standardized to mate with a corresponding contacts 21 of the chip carrier cartridge. Most contacts are for electrical signals, while certain are for optical signals (IR, visible, UV, etc.) in the case of optically-monitored or optically-excited microfluidic processors. Alternatively (not shown), the entire data acquisition and control board 26 may be a single ASIC chip that is incorporated into the chip carrier cartridge 20, wherein contacts 21, 25 would become lines on a printed circuit board.

In general, DAQ 26 controls the operation of microfluidic substrate 10 via contacts 12, 21, 25 using electrical and optical signals. Portable computer 27 typically performs high level functions, such as supplying a user interface that allows the user to select desired operations and to view the results of such operations. As shown in FIG. 1, the computer 27 is connected to DAQ 26 via connection 28, which provides data I/O, power, ground, reset, and other function connectivity. Computer 27 can also, as shown, be used to control a laboratory robot 24 via link 31. Alternatively, a wireless link 32 between the computer 27 and the DAQ 26 may be provided for data and control signal exchange via wireless elements 32(a) and 32(b). Where the data link is a wireless link, for example, the DAQ 26 may have separate power source such as, for example, a battery.

The present invention is directed to techniques for reducing the number of contacts 12, 21, 25 required for communication between the microfluidic substrate 10, chip carrier cartridge 20, and the external controller or controllers such as DAQ 26.

As explained below, the number of such contacts can become extremely large for microfluidic substrates that include many components which are independently controlled by an external controller. The following description of the operation of a microfluidic substrate 10 and DAQ 26 demonstrates the relationship between the complexity of the microfluidic substrate and the requisite number of contacts 12, 21, 25.

Structure of Microfluidic Processor

In the example shown in FIG. 1, a microfluidic substrate 10 includes three inlet ports 22 for accepting fluid reagents or samples. Preferably, these inlet ports are in a standard position on the substrate so that laboratory robot 24, where available, may be easily programmed for automatic loading of ports of several types of microfluidic processors. Otherwise, the ports should be accessible for manual loading. Where possible, reagents may also be pre-packaged on the microfluidic substrate and/or the chip carrier 20. Additionally, chip carrier 20 has micro-circuit 23 accessible through standard connectors for storing, for example, self-descriptive processor information. Alternately, chip carrier cartridge 20 may bear indicia such as a bar code to indicate the device type or further information.

Figure 2:
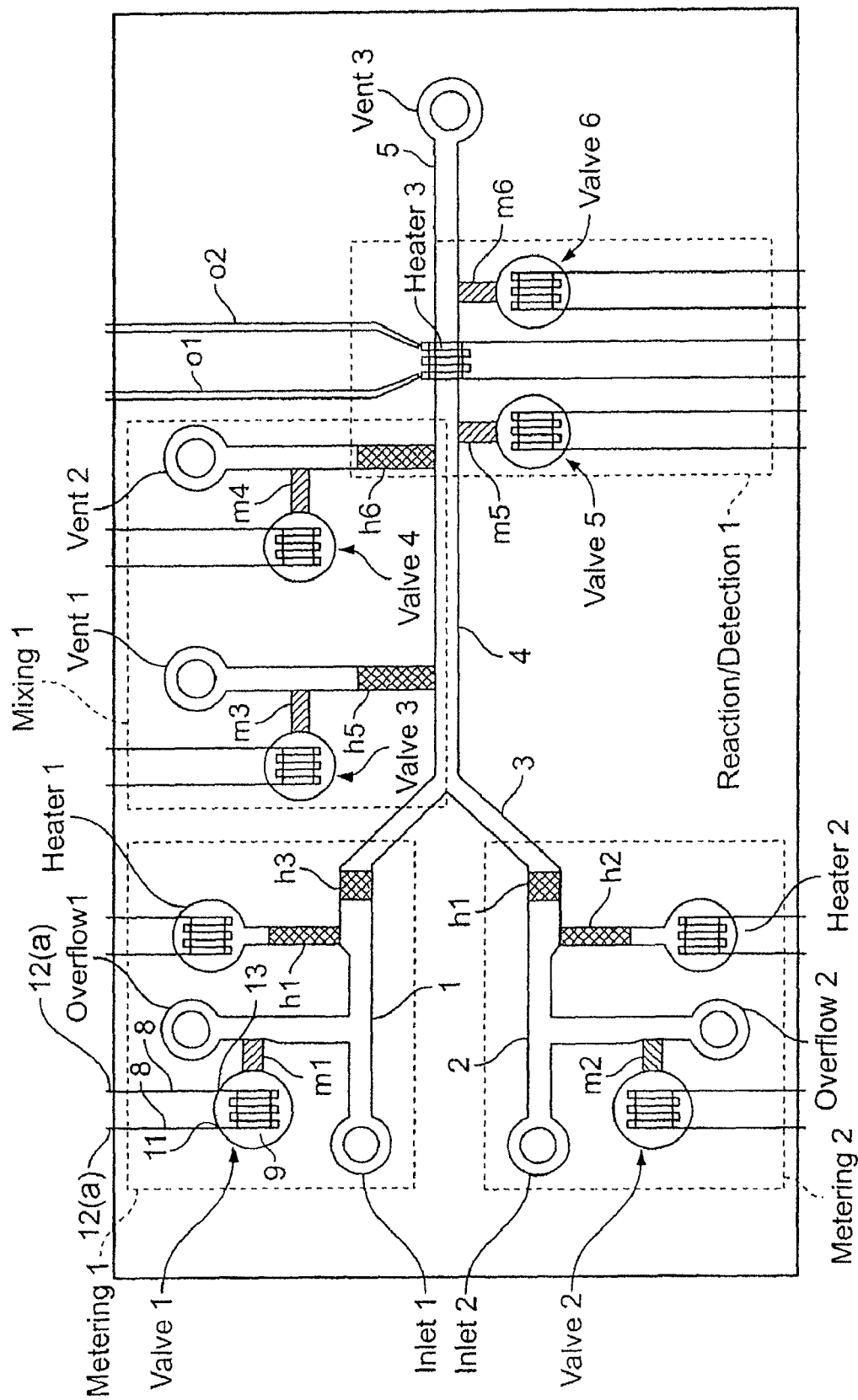
FIG. 2 illustrates the discrete droplet microfluidic processing device of FIG. 1.

FIG. 2 illustrates, schematically and not to scale, the general structure of an exemplary integrated microfluidic substrate. This microfluidic substrate is constructed from three types of sub-assemblies. In particular, this substrate has four separate sub-assemblies: two micro-droplet metering sub-assemblies, metering 1 and metering 2; one mixing sub-assembly, mixing 1; and one reaction/detection sub-assembly, reaction/detection.

These sub-assemblies are constructed from a variety of components or actuators as shown. The components include heater actuators, valve actuators, and an optical detector, all interconnected with passive inlets, overflows, vents, and reservoirs. More specifically, sub-assembly metering 1 includes inlet 1, overflow 1, valve 1, heater, and passage 1. Similarly, sub-assembly metering 2 includes inlet 2, overflow 2, valve 2, heater 2, and passage 2. The mixing subassembly, mixing 1, includes heater, heater 2, valve 3, valve 4, vent 1, vent 2, Y-shaped passage 3, and passage 4. Finally, reaction/detection 1 sub-assembly includes valve 5, valve 6, heater 3, and passage 5.

Operations of the sub-assemblies result from the coordinated operations of their component actuators under the control of an external controller, DAQ 26. The specific operation of microfluidic substrate 10 is described in greater detail in co-pending application Ser. No. 09/819,105, which is incorporated herein by reference. However, the following describes the general operation of the fluid processor under the control of DAQ 26.

First, fluid is introduced into inlet 1, for example, by an external robotic device, and flows up to the stable position created by the first hydrophobic region h3 just beyond the widening of passage 1. Any excess fluid flows out through port overflow 1. Next, DAQ 26 instructs sub-assembly metering 1 to measure a micro-droplet of determined volume from an aliquot of fluid introduced through port inlet 1, as described in co-pending application Ser. No. 09/819,105. Sub-assembly metering 2 is constructed and operates similarly to extract a measured micro-droplet of fluid from a second fluid sample likewise supplied at inlet 2.

After the pair of microdroplets are extracted from the inlet ports, DAQ 26 supplies current to heater 1 and heater 2 to generate gas pressure to propel the two microdroplets through Y-shaped passage 3 and along passage 4 to the stable position in passage 5 just beyond the junction of the side passage to vent 2. During this step, the two microdroplets merge and mix to form a single, larger micro-droplet.

Next, DAQ 26 supplies current to valve 5 and valve 6 to close these valves and isolate the micro-droplet along passage 5. DAQ 26 directs the sub-assembly reaction/detection 1 to stimulate a reaction in the trapped micro-droplet by, for example, supplying current to heater 3, which heats the micro-droplet. The DAQ then monitors the results of the stimulated reaction by optically detecting radiation conducted by optical paths o1 and o2. DAQ 26 performs these control functions by selectively supplying electrical (and sometimes optical) signals to the microfluidic substrate via contacts 12, 21, 25.

DAQ Board Architecture

Figure 3:
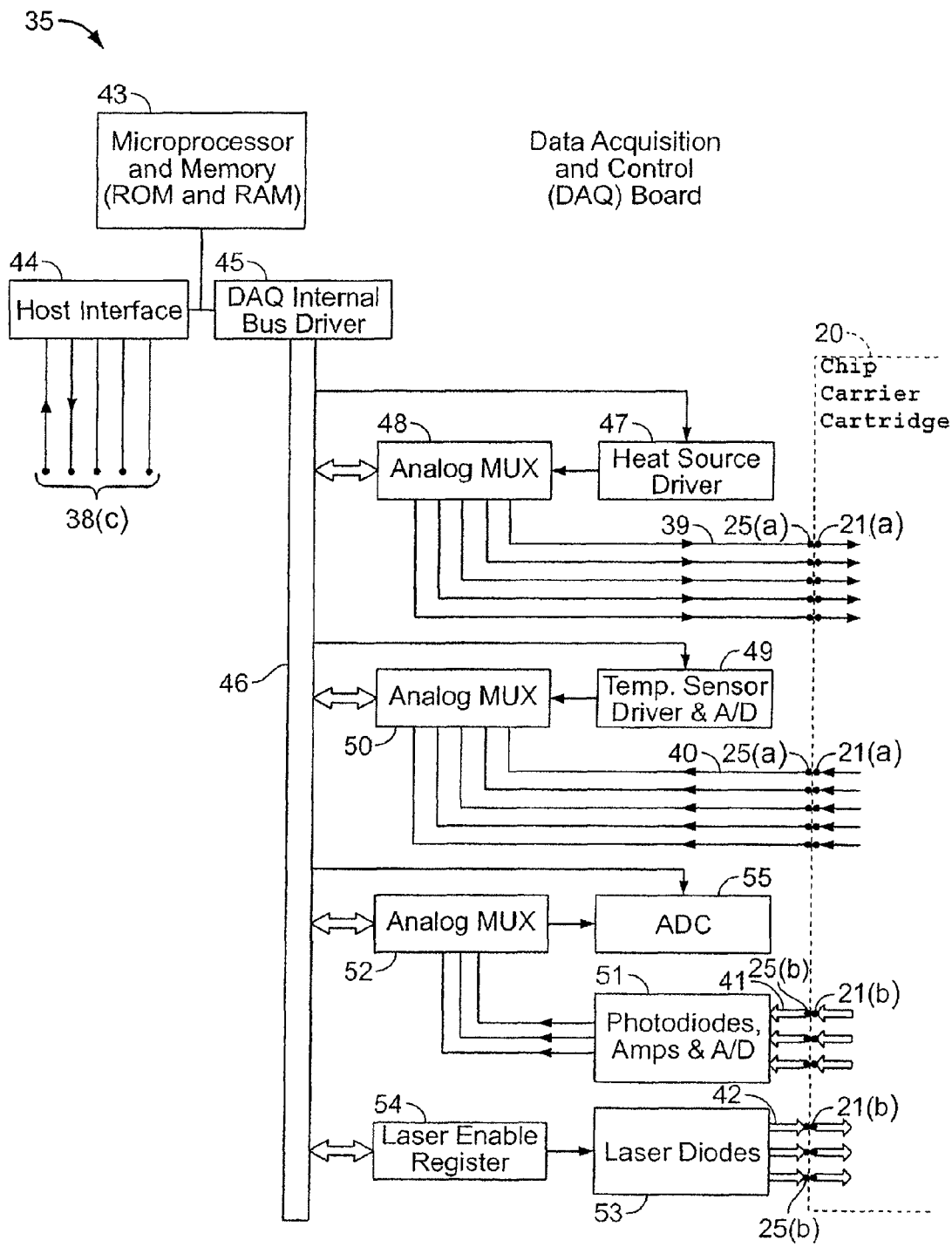
FIG. 3 illustrates the external controller of FIG. 1.

FIG. 3 illustrates a preferred hardware architecture for DAQ board 26. The DAQ board has one or more receptacles, slots, or sockets, where one or more replaceable microfluidic processors may be accommodated in a firmly supporting manner with good contact to its external contacts.

As shown, electrical contacts 25(a) on the DAQ mate with corresponding contacts 21(a) of the chip carrier cartridge 20. Thus, leads 39, 40 of the DAQ are electrically connected to corresponding leads of the chip carrier cartridge 20. Similarly, contacts 25(b) of the DAQ mate with contacts 21(b) of the chip carrier cartridge, thereby connecting via light pipe, line of sight, or by other suitable means, the DAQ's optical couplings 41, 42 to corresponding optical couplings on the chip carrier cartridge. The electrical and optical leads of the chip carrier cartridge are, in turn, connected to the microfluidic substrate 10 via contacts 12. Thus, DAQ 26 can send and receive electrical and optical signals via contacts 12, 21, 25 to and from microfluidic substrate 10 in order to engage and control a variety of components or actuators located thereon.

The electrical contacts, which may have many embodiments, are illustrated here as edge contacts that are engaged when the chip carrier cartridge and microfluidic substrate are inserted in a DAQ board receptacle. Alternatively, contacts may be suitable for engaging a flexible ribbon cable, or may by multi-pin sockets, for example. The optical contacts may be of types known for connecting fiber-optic cables.

The DAQ includes one or more heater drivers 47 for supplying a specified amount of current. The output of each heater driver 47 is connected to an analog multiplexor 48 that routes the current from the driver to a selected I/O contact 25(a). For sensing functions, the DAQ includes one or more temperature sensor drivers 49 which are each connected to an analog multiplexor 50 that multiplexes each temperature sensor driver 49 to a selected one of the plurality of I/O contacts 25(a). The DAQ also includes one or more photodiodes 51 for optical detection. Multiplexor 52 multiplexes these optical detectors to an analog-to digital converter ("ADC") 55 via a selected one of the plurality of I/O contacts 25(b). Finally, the DAQ is shown including one or more laser diodes 53. Laser enable register 54 enables selected laser diode drivers, thereby emitting light signals on corresponding optical couplings 42 and optical contacts 25(b).

Also shown in FIG. 3, the DAQ also includes a microprocessor and memory 43 for controlling the operation of the heater drivers 47, temperature sensor drivers 49, photodiodes 51, laser diodes 53 and their associated analog multiplexors 48, 50, 52, as well as laser enable register 54. More specifically, the microprocessor sends control signals to these devices via a bus driver 45 and bus 46, and reads status information from the sensing elements via the same driver 45 and bus 46. Finally, host interface 44 allows the microprocessor 43 to communicate with the general purpose computer 27 (FIG. 1) via leads 38(c) or, as described above, via wireless means.

The operation of the DAQ is exemplified by the following description of the control of a simple resistive heater, such as the resistive heater shown in valve 1 of the microfluidic device depicted in FIG. 2. As shown in FIG. 2, valve 1 includes a resistive heating element 9 that is connected at its terminals 11, 13 to a pair of I/O contacts 12(a) via leads 8. The DAQ activates this resistive heating element by instructing analog multiplexor 48 to connect the output of heater driver 47 to a pair of I/O contacts 25(a) that are connected to corresponding I/O contacts 21(a) of the chip carrier cartridge 20, that are connected to corresponding contacts 12(a) of the substrate. It then instructs heater driver 47 to supply a selected amount of current. The current supplied by heater driver 47 flows through analog multiplexor 48 and to the resistive heating element 9 via the selected leads 39 and 8.

The Relationship Between the Number of I/O Pins and the Number of Control Elements on the Microfluidic Processor For a two terminal device, such as the resistive heater described above, the system must use two I/O contacts to supply the control signals for operation of the device. Thus, if the number of two-terminal devices on the microfluidic process is N, then 2×N I/O contacts are sufficient to allow DAQ 26 to independently control each of the devices.

However, for complex microfluidic devices the number of I/O contacts can be unreasonably large. In the simple microfluidic device shown in FIG. 2, where only nine different resistive heating elements are shown, only eighteen contacts are required. For increasingly complex microfluidic devices having hundreds of independently controlled components, the number of contacts becomes excessive.

Figure 4A:
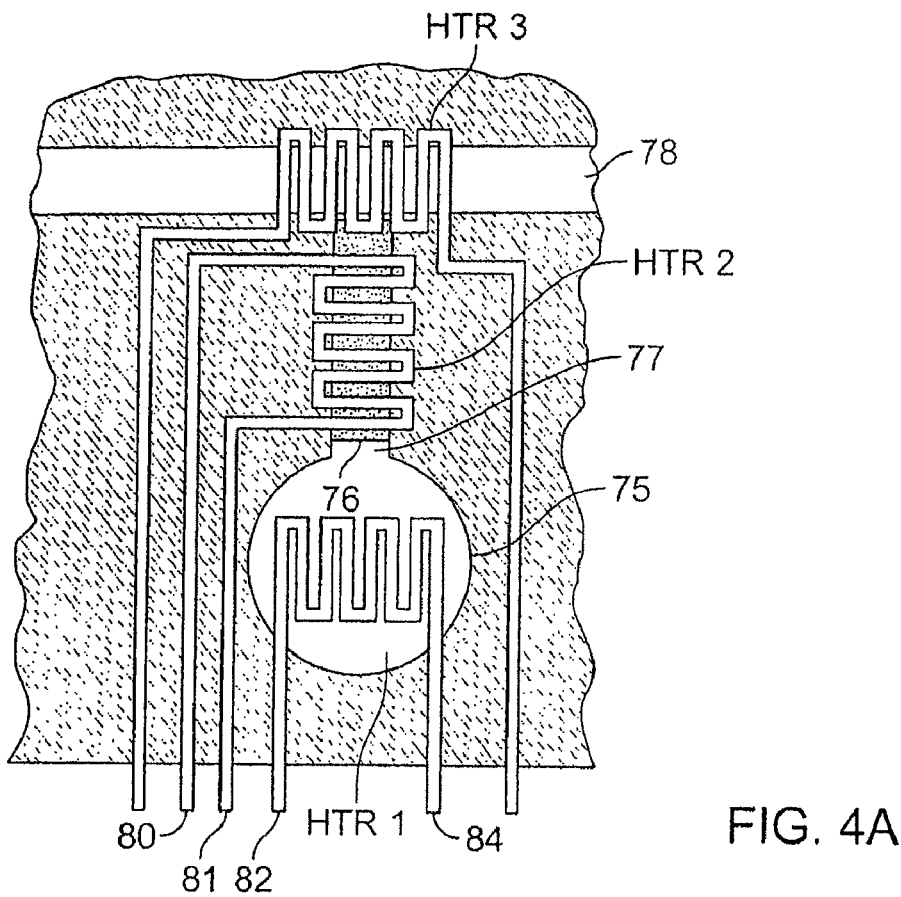
FIGS. 4A-B illustrate a micro-valve actuator.
Figure 4B:
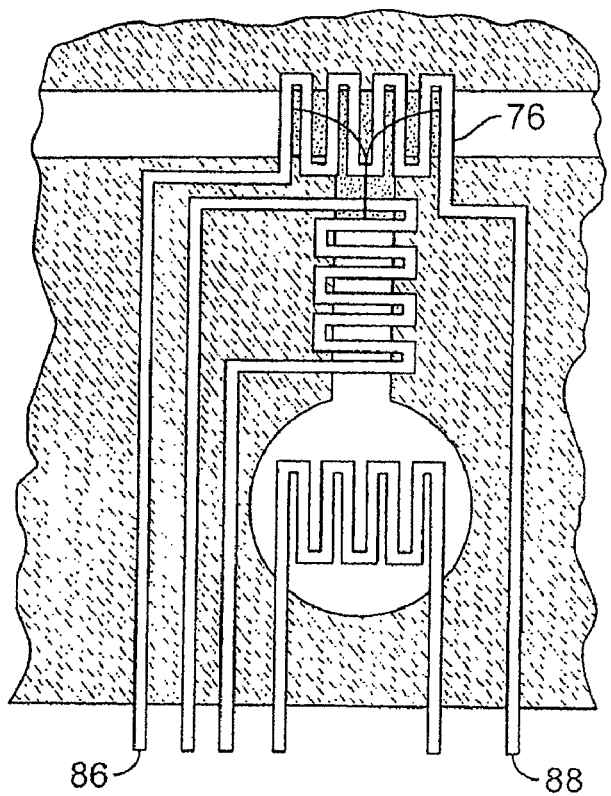

Moreover, for discrete droplet fluid processing systems such as described in co-pending application Ser. No. 09/819, 105, even relatively simple microfluidic processors may employ a large number of contacts. For example, FIGS. 4A and 4B depict a preferred valve structure for such fluid processing systems that includes three separate resistive heaters for each valve. Referring to FIGS. 4A and 4B, the operation of the preferred valve structure is described in detail below.

FIG. 4A depicts the valve in its open position, having a wax plug 76 positioned within side channel 77. To close this valve, DAQ controller supplies current to resistive heater HTR2 via I/O contacts 80, 81. This causes HTR2 to warm, thereby melting plug 76. DAQ 26 then supplies current to HTR1 via I/O contacts 82, 84 to thereby heat gas within chamber 75. As the gas expands, it forces plug 76 to move into channel 78 as shown in FIG. 4B. DAQ 26 then shuts off heater HTR2 and allows the plug to cool, thereby blocking channel 78 and side channel 77. When the plug is cool, DAQ 26 then shuts off HTR1. As HTR1 cools, the pressure in chamber 75 drops, thereby creating a negative pressure which, as will be explained below, may be used to re-open the valve.

To open the valve, DAQ 26 supplies current to HTR3 via I/O pins 86, 88 to warm the heater and thereby melt the plug. Once the plug is melted, the negative pressure in chamber 75 draws the plug back into side channel 77, thereby re-opening channel 78.

If such bidirectional valves are used to implement the microfluidic device shown in FIG. 2, the number of independently controlled resistive elements nearly triples from nine to twenty-one. However, to accurately control the temperature of each of these resistive elements, even more components may be used.

Figure 5:
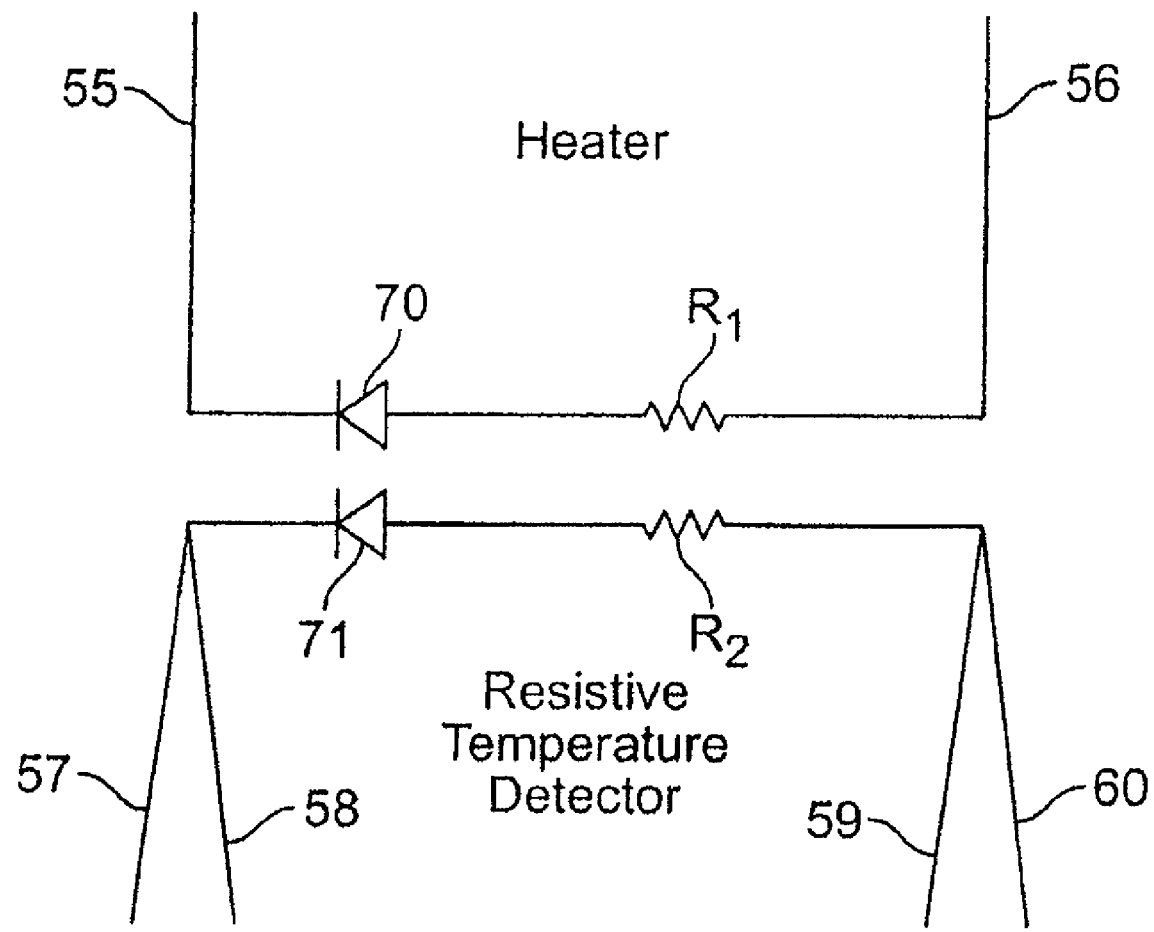
FIG. 5 illustrates a heating component having resistive temperature detectors.

FIG. 5 depicts a six-terminal resistive heating device. The device includes a two terminal heating element R1 that operates in accordance with heating element 9 of FIG. 2. The device also includes a current flow directional element 70, which allows current to flow substantially only in a single direction between leads 55, 56. As shown in FIG. 5, current flow directional element 70 is a diode configured to allow current to flow from lead 56 to lead 55. Current flow directional element 70 substantially prevents, and preferably excludes, current flow from lead 55 to lead 56. Current flow directional element 70 may be any element that allows current to flow predominately in one direction between points of a circuit. Diodes are preferred current flow directional elements.

The device of FIG. 5 also includes a four terminal resistive sensor element R2 in close proximity to R1 so as to be in thermal communication therewith. A current flow directional element 71, which has generally the same functional characteristics as current flow directional element 70, allows current to flow in substantially one direction between leads 57, 58 and leads 59, 60. In the configuration shown, current flow directional element 71 allows current to flow from leads 59, 60 to leads 57, 58 but substantially prevents, and preferably excludes, current flow from leads 57, 58 to leads 59, 60.

Current flow directional elements 70 and 71 may be but are not necessarily formed by microfabrication on a substrate with elements R1 and R2. Rather, current flow directional elements 70 and 71 may be disposed at other positions along current pathways that respectively include R1 and R2. Current flow directional elements 70 and 71 are preferably disposed in series with R1 and R2.

The sensor R2 may operate as follows. While DAQ 26 supplies current to R1 (via leads 55, 56) it also supplies a relatively low current to R2 via leads 57, 60. R2 is a resistive element whose resistance increases with temperature. Accordingly, the voltage across R2 increases with the temperature in the nearby region being heated by heating element R1, and therefore element R2 can be used to measure the temperature in this region. DAQ 26 determines the temperature by measuring the voltage across R2 via leads 58, 59. More specifically, referring now to FIG. 3, DAQ 26 instructs the analog multiplexor to connect temperature sensor driver 49 to the contact pins 25(a) which are connected to leads 58, 59. Temperature sensor driver 49 then determines the voltage across R2, thereby providing a measure of the temperature in the vicinity of R1.

Thus, if such devices are used in a microfluidic processor, the number of I/O contacts increases even further. For example, one hundred and twenty six contacts are required for the micro-fluid processor shown in FIG. 2.

The present invention is directed to techniques for reducing the number of I/O contacts required for an external controller, such as DAQ 26, to independently control a large number of components within microfluidic devices, such as those described above.

Figure 6A:
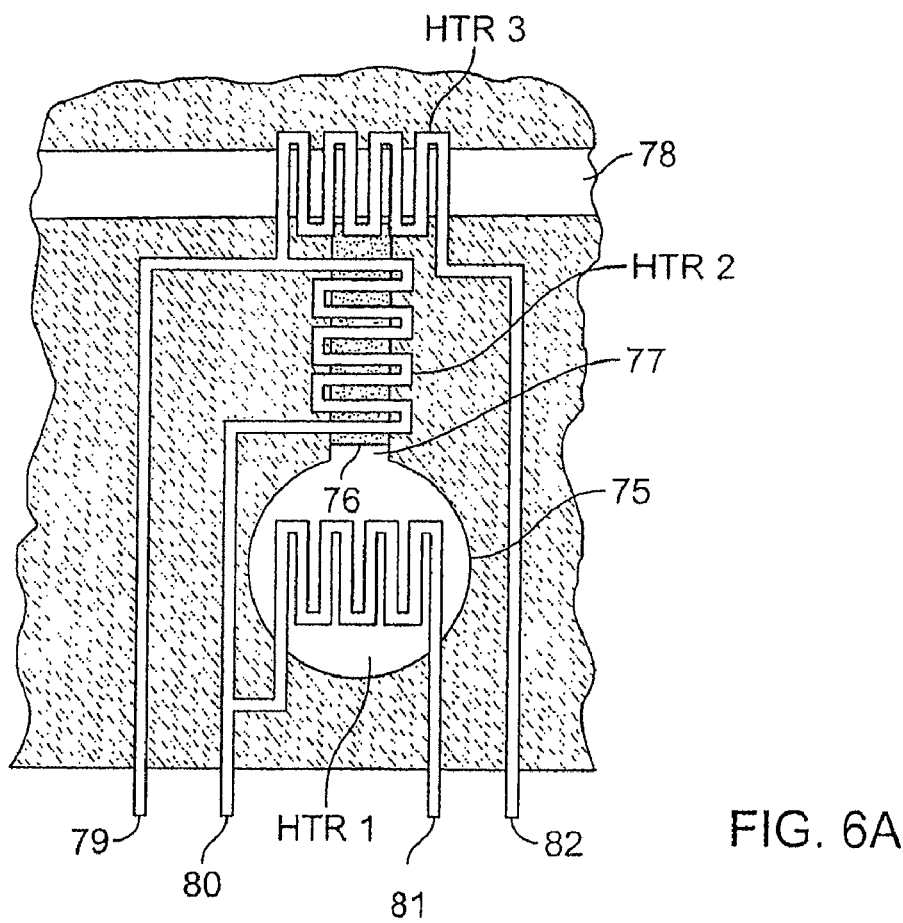
FIGS. 6A-B illustrate a micro-valve actuator having a reduced number of I/O contacts.
Figure 6B:
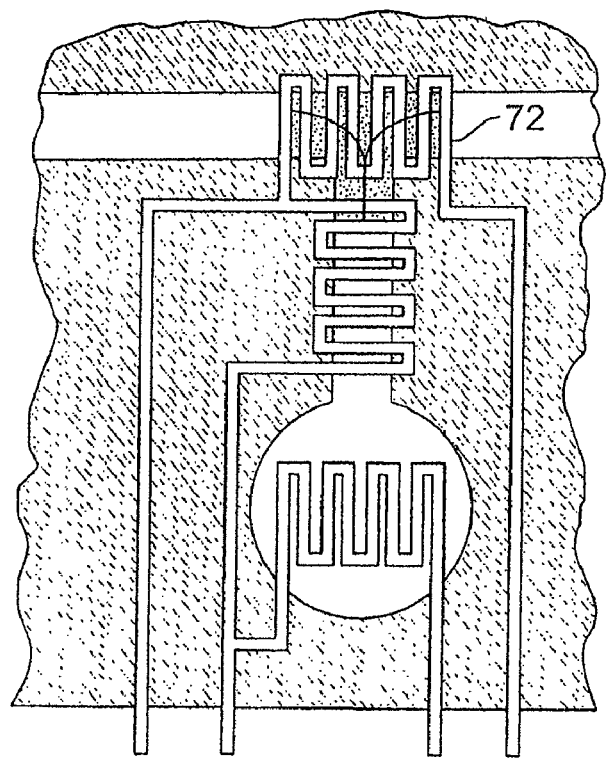

FIGS. 6A, 6B illustrate a technique for reducing the number of I/O contacts by structuring the leads of the microfluidic device so that each lead serves more than one component, while still allowing DAQ 26 to control each component of the microfluidic device independently of the others. Specifically, FIGS. 6A, 6B depicts a technique for sharing I/O contacts among three of the two-terminal resistors of a bidirectional value structure, such as shown in FIGS. 4A-B discussed above. The valve operates essentially the same as the valve shown in FIGS. 4A, B, except that it uses only four contacts rather than six. In this example, each resistor is connected to a pair of I/O contacts and therefore can be controlled by the DAQ in the same way as described above. Although the other resistors share these I/O contacts, no resistor shares the same pair of contacts with another. Accordingly, the DAQ is able to supply current to any given resistor via the pair of associated contacts, without activating any other resistor.

More generally, the number of I/O contacts required for the independent control of a plurality of resistive heaters may be reduced by arranging the contact wiring to each resistor in the form of a logical array. The resulting compression of the number of I/O contacts advantageously simplifies communication with the entire processor. Because each resistor requires two leads to complete an electrical circuit, according to a conventional arrangement of leads and contacts, a device having N resistors requires 2N leads and 2N contacts. By configuring the contact wiring in a shared array, however, the number of required contacts can be reduced to as few as 2/N. For example, in a device comprising 100 resistors, the number of external contacts can be reduced from 200 to 20.

Figure 7A:
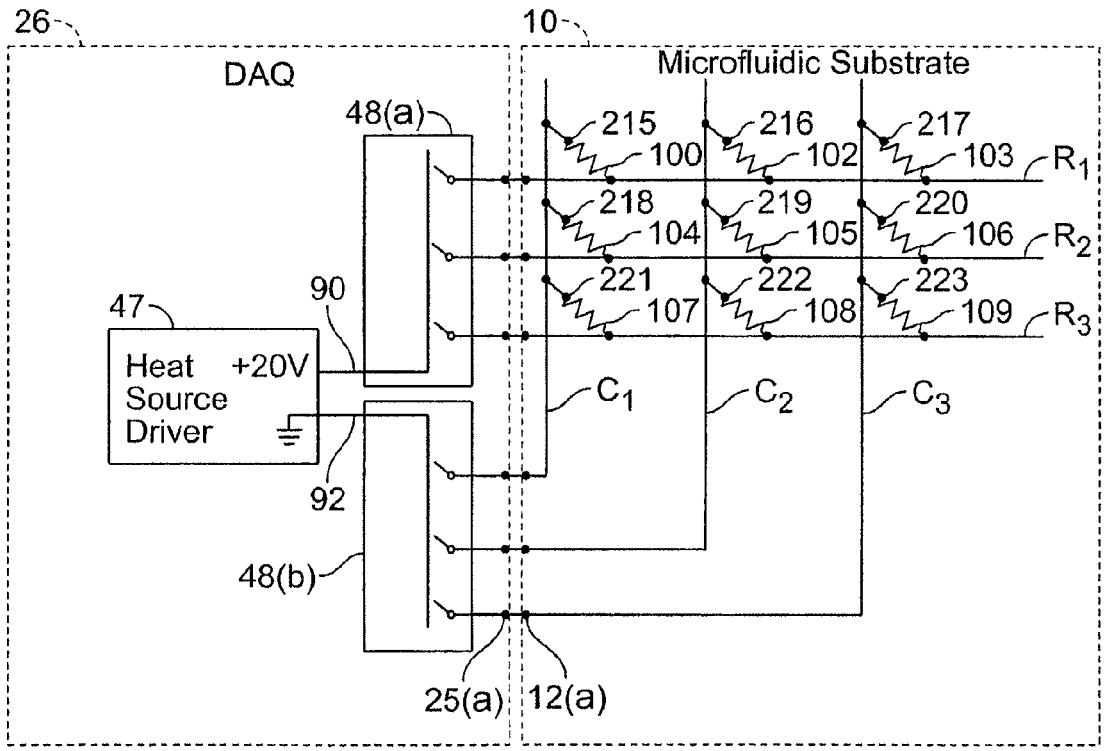
FIGS. 7A-B illustrate a technique for sharing conductive leads that supply current to resistive heaters within a microfluidic processing device.
Figure 7B:
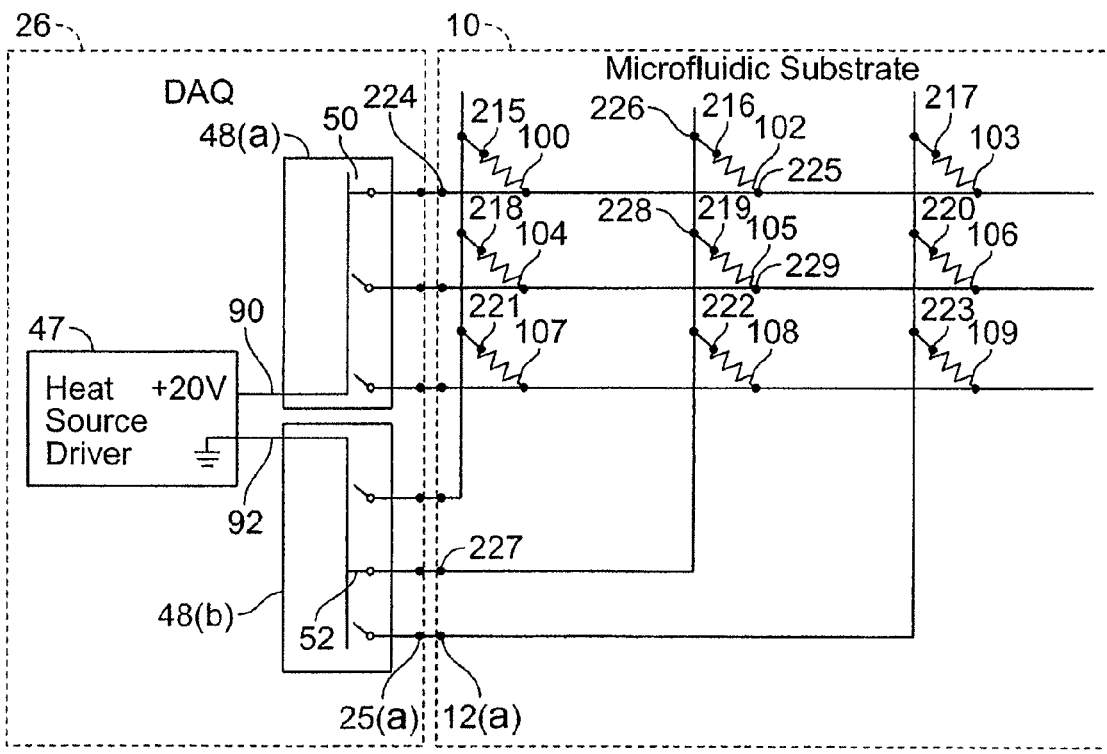

FIGS. 7A, 7B depict a DAQ 26 directly connected to a microfluidic substrate 10, without the use of an intermediate chip carrier cartridge 20, and show an array of resistive heaters within microfluidic substrate 10. The leads between contacts 12(a) and resistive heaters 100, 102-109 are shown arranged in columns and rows. However, the actual physical layout of the leads will not necessarily be a physical array. Rather, the leads will be directly routed from the resistive components to contacts 12(a) in any manner that allows each lead to connect to a plurality of resistors while remaining electrically isolated from other leads.

According to this arrangement, electrical contacts for N resistors are assigned to R rows and C columns such that the product RC≧N, preferably where R is approximately equal to C, and most preferably where R=C. With this arrangement, resistors assigned to the same row share a common electrical lead and I/O contact 12(a). Similarly, resistors assigned to the same column also share a lead and I/O contact 12(a). However, each resistor has a unique address, corresponding to a unique pair of I/O contacts, (i.e., to its unique row/column combination in the array). Therefore, each resistor is individually actuatable by supplying electric current to the appropriate pair of I/O contacts.

As used herein, a "resistor" or "component" that is uniquely associated with a pair of contacts may also refer to a resistive network (having a plurality of resistive sub-components connected in series and/or parallel) or a component network (having a plurality of sub-components connected in series or parallel). In such embodiments, all sub-components are activated together when the external controller supplies signals across the pair of contacts uniquely associated with those sub-components.

As shown in FIG. 7A, the leads are arranged in three rows ($R_j$, where j=1-3) and three columns ($C_i$, where i=1-3). For each resistor, one terminal is connected to a row and the other terminal is connected to a column. Although each resistor shares these leads with other resistors, no two resistors share the same pair of leads. In other words, each resistor is uniquely associated with a particular row/column pair $R_j$, $C_i$.

FIGS. 7A, 7B illustrate the operation of this structure. Heater driver 47 supplies an output voltage of twenty volts on its terminals for supplying current to resistive heating elements 100, 102-109. The positive output terminal 90 is connected to a first analog multiplexor 48(a). As shown, this terminal can be connected to any one of the rows of the array of leads by individual switching elements within analog multiplexor 48(a). Similarly, the negative output terminal 92 of heater driver 47 is connected to a second analog multiplexor 48(b). Multiplexer 48(b) allows terminal 92 to connect to any column in the array of leads.

In FIG. 7A, the switching elements within analog multiplexors 48(a,b) are all open. Accordingly, none of the heating elements 100-109 as shown are active. FIG. 7B depicts the condition of analog multiplexors 48(a,b) after DAQ 26 has instructed them to close certain internal switches to thereby supply current to a selected one of the resistors in the array. In this example, the row switch element 50 is closed, to thereby connect the positive terminal of heater 47 to the top row of the lead array. The column switch element 52 is also closed to connect the negative terminal of heater 47 to the middle column of the lead array. Thus, the positive terminal 90 of heater 47 is connected to resistors 100, 102, 103 and the negative terminal is connected to resistors 102, 105, 108. However, only one of these resistors, 102, is connected across both terminals of heater 47. Accordingly only resistor 102 receives current and is heated.

Resistive heating elements 100, 102-109 are disposed in series with respective current flow directional elements 215-223, which allow current to flow in one direction between the positive output terminal 90 of a heater driver 47 and a negative or ground terminal 92 of heater driver 47 along a current path that includes one of resistive heating elements 100, 102-109. Current flow directional elements 215-223 are preferably configured allow current to flow only from positive output terminal 90 to negative output terminal 92. Thus, for example, current may flow from a point 224 to a point 225, through resistive heater 102 to point 226 and then to point 227. The current flow directional elements, however, prevent current from passing through current pathways including resistive heaters other than resistive heater 102. For example, current flow directional element 219 prevents current flow between points 228 and 229. Current flow directional elements 215-223 may be diodes as discussed above for current flow directional elements 70, 71.

Figure 8A:
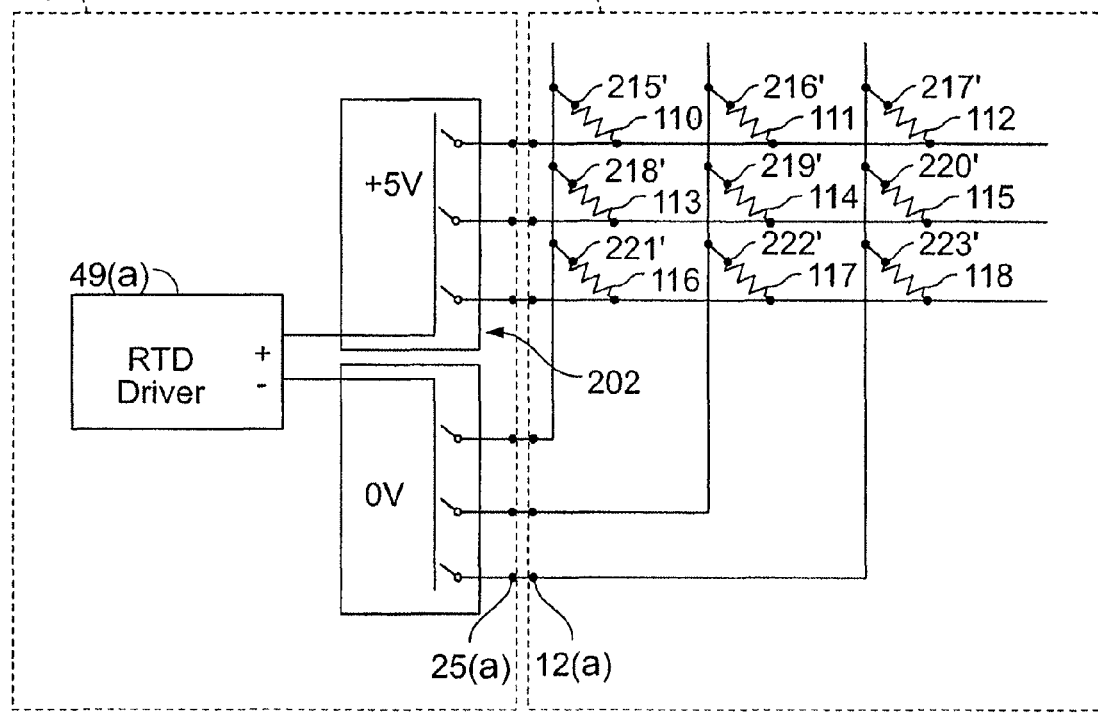
FIGS. 8A-B illustrate a technique for sharing conductive leads for resistive temperature detectors ("RTDs")
Figure 8B:
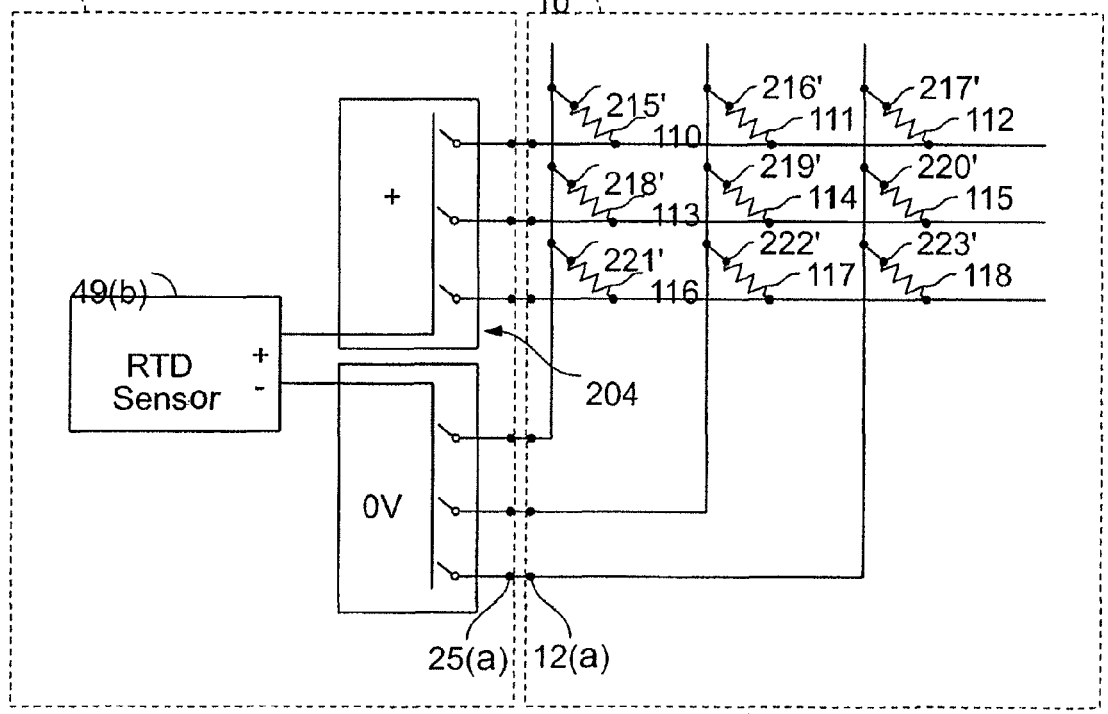

FIGS. 8A, 8B, 9A, 9B depict similar arrays for the resistive elements used to sense temperature, such as R2 shown in FIG. 5. FIG. 8A depicts one array of leads for supplying current to resistive sensors 110-118. FIG. 8B depicts another set of leads for measuring the voltage across the same resistors. With this structure, the leads that are used to stimulate the resistive sensors carry no current from the heater driver 47 because they are electrically isolated from heater driver 47. Similarly, the leads for sensing the voltage of the resistive sensors 110-118 (FIG. 8B) carry essentially no current because they are isolated from the leads that supply current from heater driver 47 and RTD driver 49(a) (shown in FIGS. 7A, 7B and 8A). This structure provides the most accurate temperature measurement.

Figure 9A:
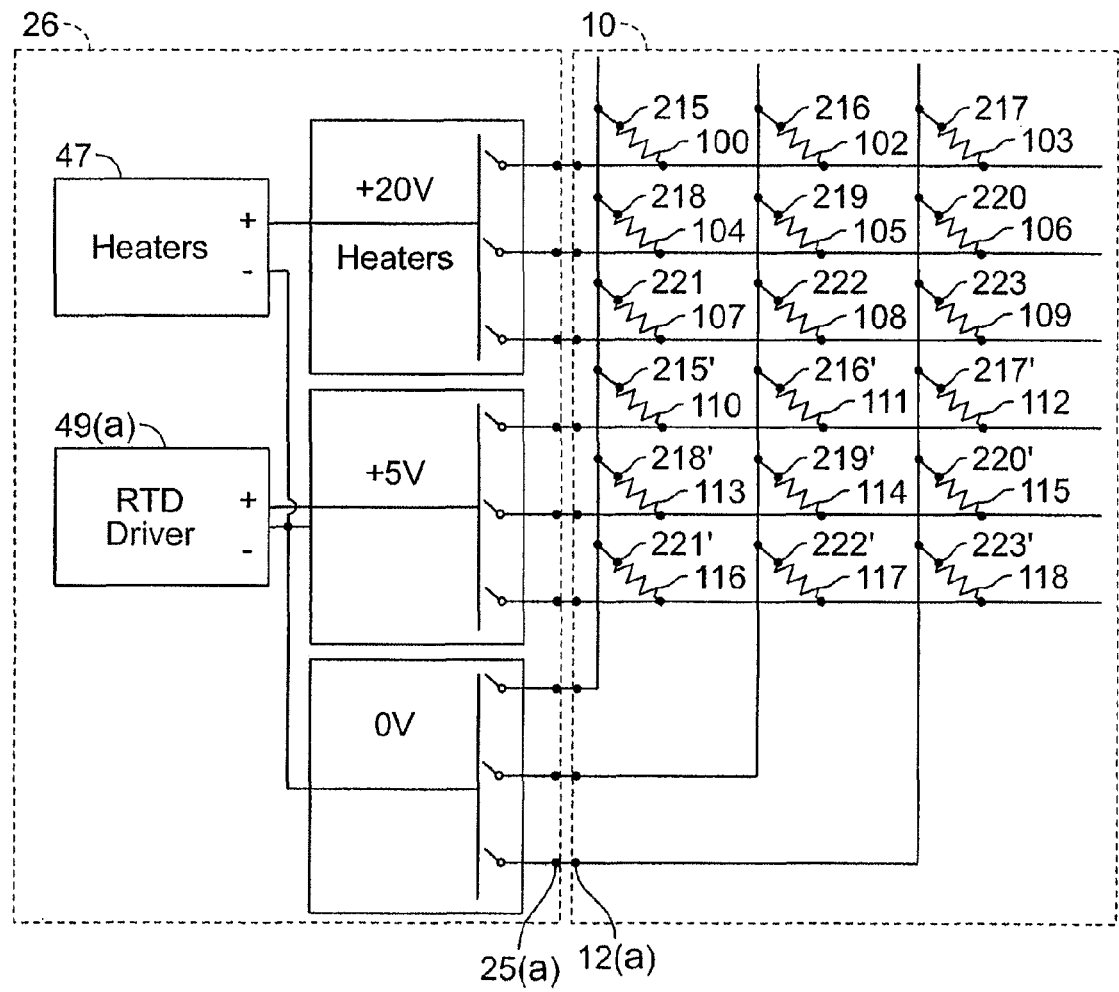
FIGS. 9A-B illustrate a technique for sharing conductive leads for resistive heaters and RTDs.
Figure 9B:
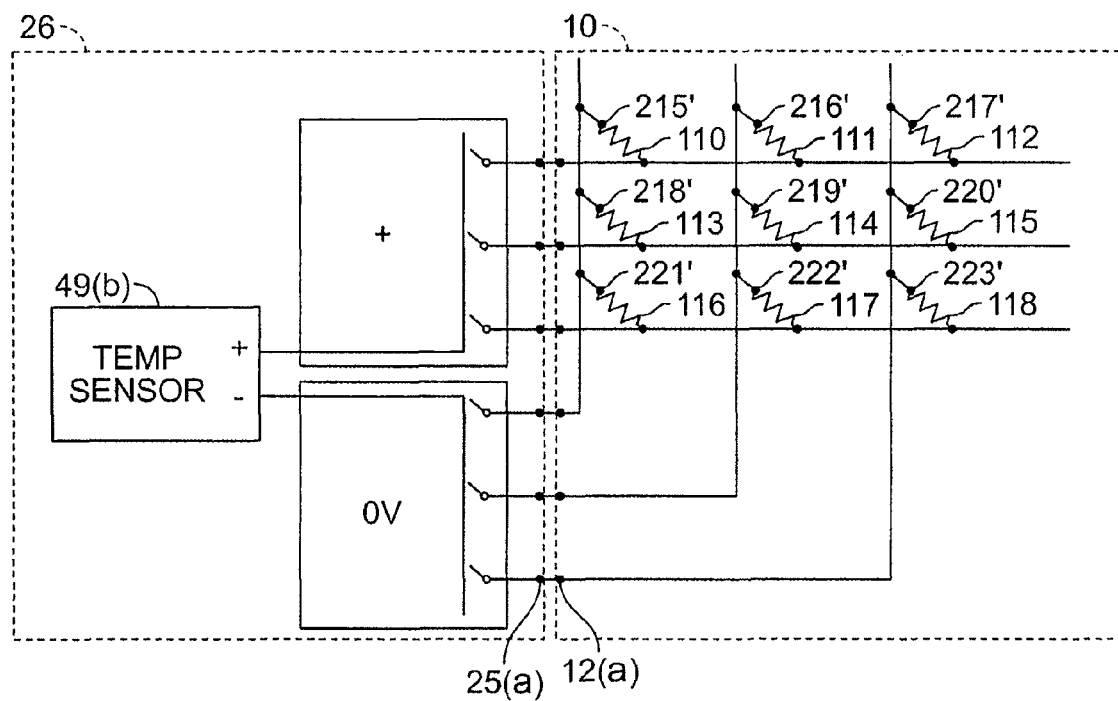

FIGS. 9A, 9B depict an alternative structure. As with the structure shown in FIGS. 8A, 8B, the leads for sensing the voltage across resistive sensors, 110-118, are isolated from both of the current sources (heater driver 47 and RTD driver 49(a)). However, both current sources 47, 49(a) share the same leads for current return, i.e., the leads depicted as columns in the array. This provides greater compression of the number of leads; however, the resistivity in the shared return leads may reduce the accuracy of the temperature measurement.

The arrays of FIGS. 8A, 8B, 9A, and 9B include current flow directional elements 215'-223', which allow current to flow in only one direction through resistive sensors 110-118. Thus, current flow directional elements 215'-223' preferably allow current to flow in only one direction between the positive terminal of RTD driver 49(a) or RTD sensor 49(b) and the negative or ground terminal of RTD driver 49(a) or RTD sensor 49(b) along a current path that includes one of resistive sensors 110-118. Preferably, current flow directional elements 215'-223' allow current to flow from the positive terminal to the negative terminal or ground terminal of either RTD driver or RTD sensor but not from the negative or ground terminal to the positive terminal thereof Current flow directional elements 215'-223' may be diodes similar to current flow directional elements 70, 71.

While the invention has been illustratively described herein with reference to specific aspects, features and embodiments, it will be appreciated that the utility and scope of the invention is not thus limited and that the invention may readily embrace other and differing variations, modifications and other embodiments. For example, the same techniques for reducing the number of leads may be-applied to other types of components, not just resistors. The invention therefore is intended to be broadly interpreted and construed, as comprehending all such variations, modifications and alternative embodiments, within the spirit and scope of the ensuing claims.

A number of references are cited herein, the entire disclosures of which are incorporated herein, in their entirety, by reference for all purposes. Further, none of these references, regardless of how characterized above, is admitted as prior to the invention of the subject matter claimed herein.

What is claimed is:

1. A method of controlling a microfluidic device comprising a plurality of N independently controllable components each having at least a first terminal and a second terminal with an external controller, the method comprising:
    sending a first current to a first independently controllable component through a first lead connecting to a plurality of first terminals of a first group of the independently controllable components;
    receiving a first current from the first independently controllable component through a second lead connecting to a plurality of second terminals of a second group of independently controllable components, wherein the first current corresponds to heating of the reaction chamber;
    sending a second current to a second independently controllable component through a third lead connecting a plurality of first terminals of a third group of independently controllable components; and,
    receiving a second current from the second independently controllable component through a fourth lead connecting to a plurality of second terminals of a fourth group of independently controllable components.

2. The method of claim 1, wherein the second current corresponds to optical monitoring of the reaction chamber.

3. The method of claim 1, wherein the second current corresponds to heating of a thermally operative component.

4. The method of claim 1, wherein the second current corresponds to moving a microdroplet in the microfluidic device.

5. The method of claim 1, wherein the first independently controllable component is the only independently controllable component common to the first group and second group of independently controllable components.

6. The method of claim 1, wherein the second independently controllable component is the only independently controllable component common to the third group and fourth group of independently controllable components.

7. The method of claim 1, wherein the first independently controllable component comprises a resistive heating element.

8. The method of claim 1, wherein the first independently controllable component comprises a resistive sensing element.

9. The method of claim 1, wherein one of the independently controllable components comprises a plurality of independently controllable subcomponents.

10. The method of claim 1, wherein the independently controllable subcomponents each comprise a first and second terminal each connected to a lead.

11. The method of claim 1, further comprising controlling a first subcomponent, the controlling comprising:
    sending a first subcomponent current to the first subcomponent through the lead connected to the first terminal of the first subcomponent; and,
    receiving a first subcomponent current from the first subcomponent through the lead connected to the second terminal of the first subcomponent.

12. The method of claim 11, wherein the lead connected to the first terminal of the first subcomponent connects to a terminal of at least one additional component or subcomponent.

13. The method of claim 12, wherein the lead connected to the second terminal of the first subcomponent connects to a terminal of at least one additional component or subcomponent.

14. The method of claim 13, wherein the lead connected to the first terminal of the first subcomponent and the lead connected to the second terminal of the first subcomponent only both connect the first subcomponent.

15. The method of claim 1, wherein at least one of the leads comprises a current directional flow element.

16. The method of claim 15, wherein the current directional flow element comprises a diode.

17. The method of claim 1, further comprising periodically and intermittently sending the first current to cyclically heat the reaction chamber.

18. A system configured to perform operations on a microdroplet, the system comprising:
    a microfluidic device comprising:
        a plurality of N independently controllable components each including a first terminal and a second terminal;
        a plurality of leads, wherein each lead connects to two or more terminals which are each associated with a unique independently controllable component; and,
        a reaction chamber; and,
    a controller comprising stored instructions to control the operation of the independently controllable components, wherein the stored instruction comprise sending a current to a first independently controllable component corresponding to heating the reaction chamber.

19. The system of claim 18, wherein the microfluidic device further comprises a current directional flow unit.

20. The system of claim 19, wherein the current directional flow unit comprises a diode.

* * * * *

UNITED STATES PATENT AND TRADEMARK OFFICE
CERTIFICATE OF CORRECTION

PATENT NO.      : 8,323,584 B2  
APPLICATION NO. : 13/280270  
DATED           : December 4, 2012  
INVENTOR(S)     : Ganesan Page 1 of 1

It is certified that error appears in the above-identified patent and that said Letters Patent is hereby corrected as shown below:

Title Page (item 63, Related U.S. Application Data) at line 5, change "continuation" to --continuation-in-part--.

In the Specification

In column 10 at line 61, change "thereof" to --thereof.--.

Signed and Sealed this
Eleventh Day of November, 2014

Michelle K. Lee
*Deputy Director of the United States Patent and Trademark Office*